United States Patent
Sasaki et al.

(10) Patent No.: US 6,609,291 B1
(45) Date of Patent: Aug. 26, 2003

(54) METHOD OF MANUFACTURING A THIN FILM MAGNETIC HEAD

(75) Inventors: Yoshitaka Sasaki, Yokohama (JP); Atsushi Iijima, Saku (JP); Kazumasa Fukuda, Komoro (JP)

(73) Assignee: TDK Corporation, Tokyo (JP)

( * ) Notice: Subject to any disclaimer, the term of this patent is extended or adjusted under 35 U.S.C. 154(b) by 275 days.

(21) Appl. No.: 09/592,918

(22) Filed: Jun. 13, 2000

Related U.S. Application Data

(62) Division of application No. 09/099,461, filed on Jun. 18, 1998, now Pat. No. 6,130,805.

(30) Foreign Application Priority Data

Nov. 19, 1997 (JP) .............................................. 9-317816
Apr. 28, 1998 (JP) .......................................... 10-119134

(51) Int. Cl.⁷ .......................... G11B 5/127; H04R 31/00
(52) U.S. Cl. ............................... 29/603.14; 29/603.07; 29/603.15; 29/603.23; 360/113; 360/126
(58) Field of Search ....................... 29/603.14, 603.15, 29/603.07, 603.23; 360/113, 126

(56) References Cited

U.S. PATENT DOCUMENTS

| 5,153,980 A | * | 10/1992 | Kira ..................... 29/603.14 |
| 5,872,693 A | | 2/1999 | Yoda ...................... 360/126 |
| 5,878,481 A | * | 3/1999 | Feng et al. ............. 29/603.15 |
| 5,935,644 A | | 8/1999 | Heim ..................... 360/126 |

FOREIGN PATENT DOCUMENTS

| JP | A-8-339508 | 12/1996 |
| JP | A-8-3395008 | 12/1996 |
| JP | A-10-105919 | 4/1998 |

\* cited by examiner

Primary Examiner—Richard Chang
(74) Attorney, Agent, or Firm—Oliff & Berridge, PLC

(57) ABSTRACT

A method of manufacturing a thin film magnetic head including the steps of forming a first magnetic layer, a band-shaped insulating layer, a gap layer, a second magnetic layer, a thin film coil, a third magnetic layer wherein the substrate, pole portions of the first and second magnetic layers and gap layer sandwiched by the magnetic layers to form the air bearing surface which is to be opposed to a magnetic record medium is polished.

12 Claims, 17 Drawing Sheets

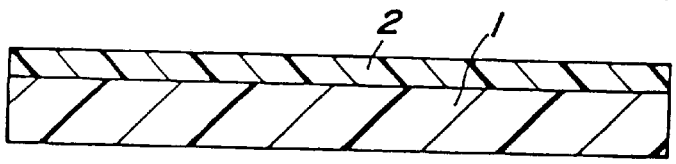 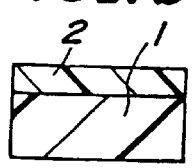
PRIOR ART FIG_1a    FIG_1b
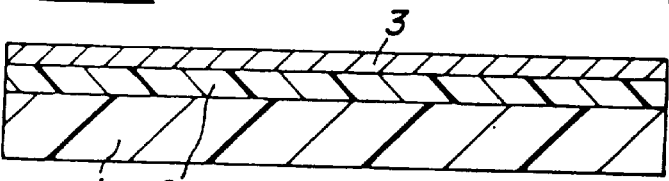 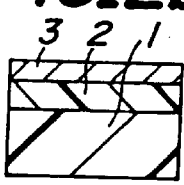
PRIOR ART FIG_2a    FIG_2b
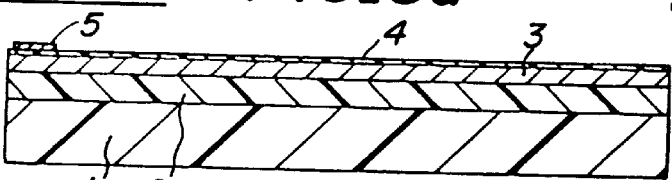 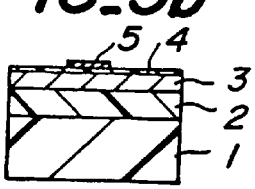
PRIOR ART FIG_3a    FIG_3b
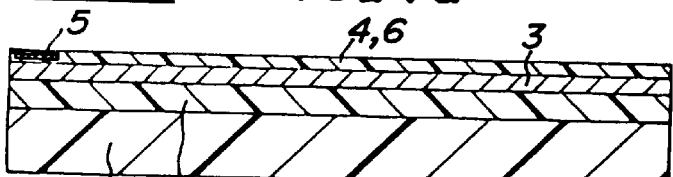 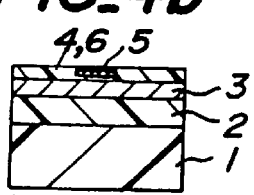
PRIOR ART FIG_4a    FIG_4b
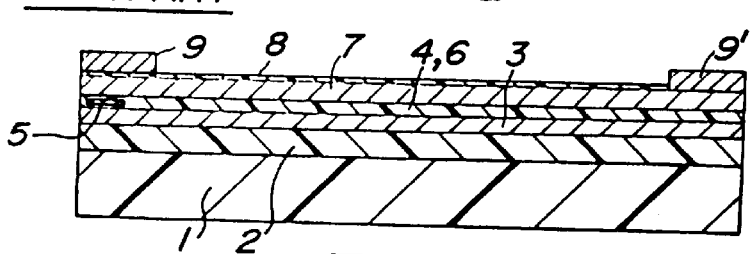 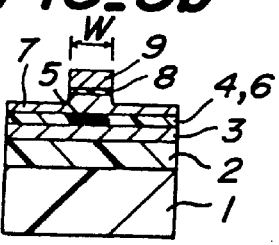
PRIOR ART FIG_5a    FIG_5b
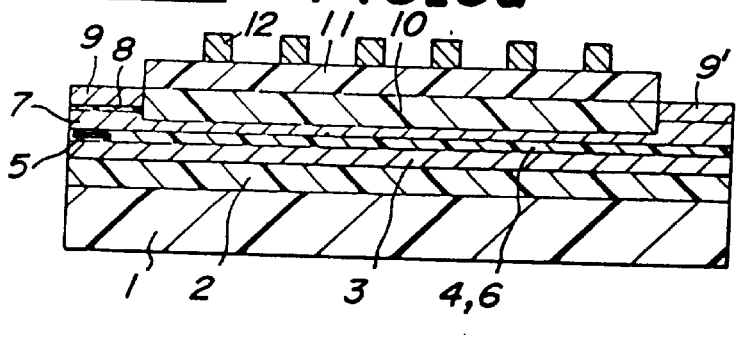 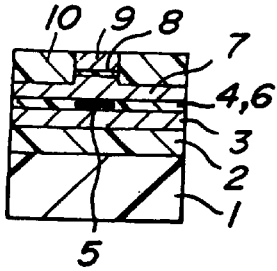
PRIOR ART FIG_6a    FIG_6b PRIOR ART FIG. 7a FIG. 7b
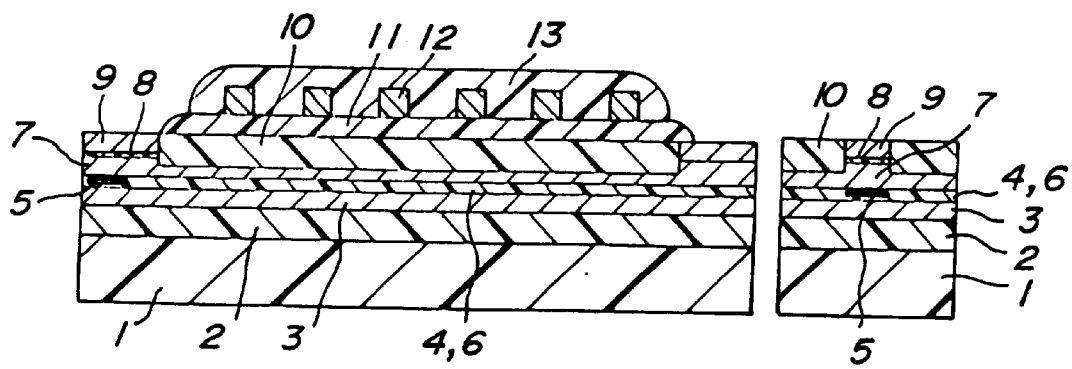
PRIOR ART FIG. 8a FIG. 8b
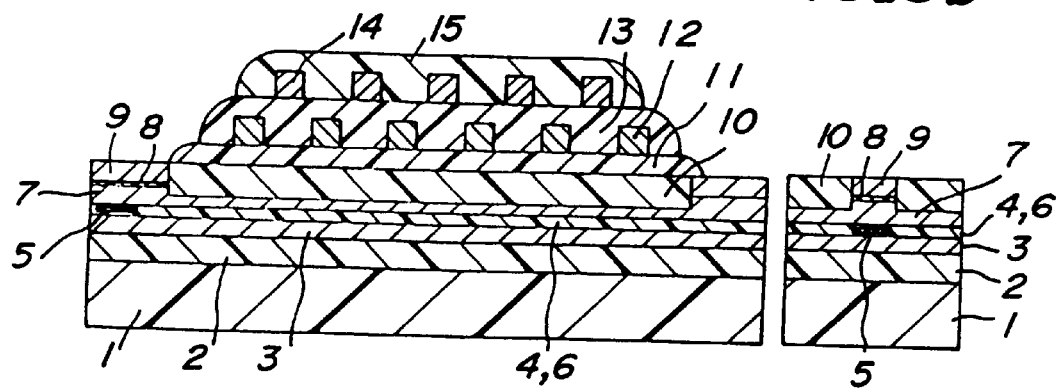
PRIOR ART FIG. 9a FIG. 9b
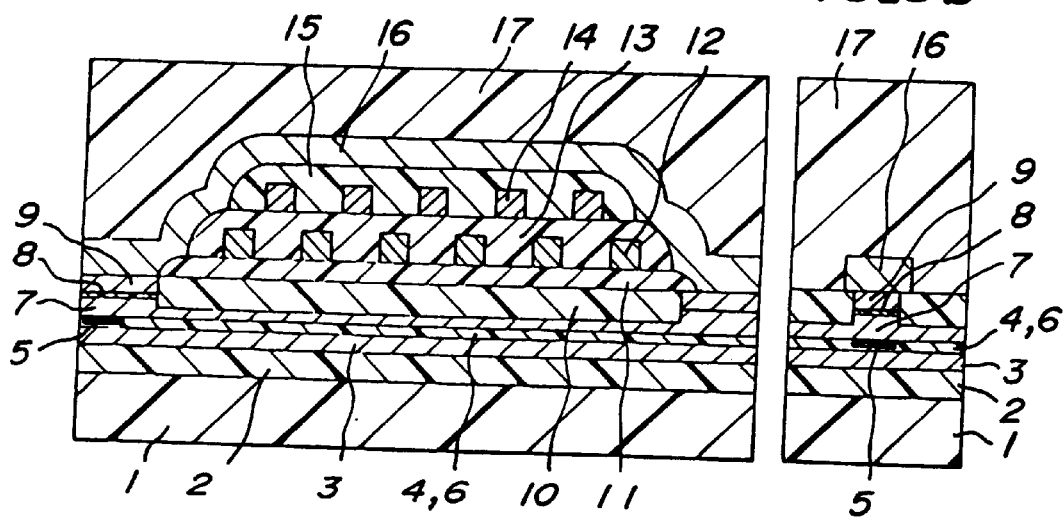

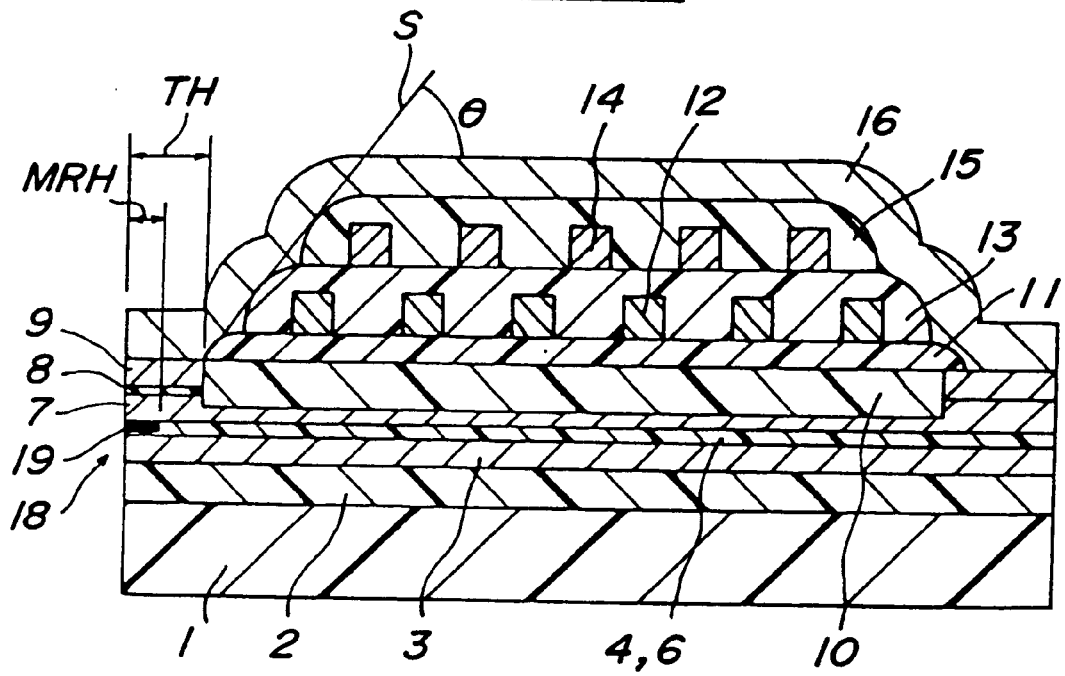
FIG_10
PRIOR ART
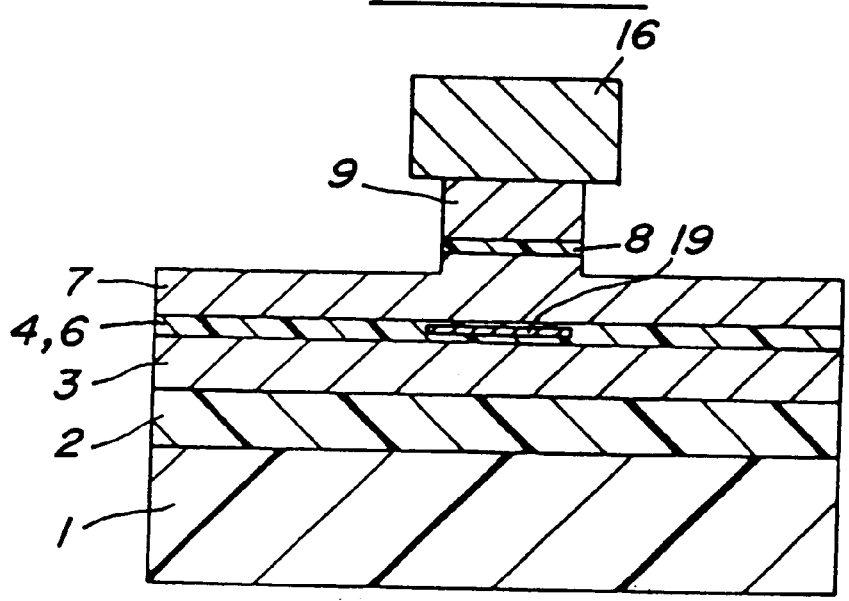
FIG_11
PRIOR ART

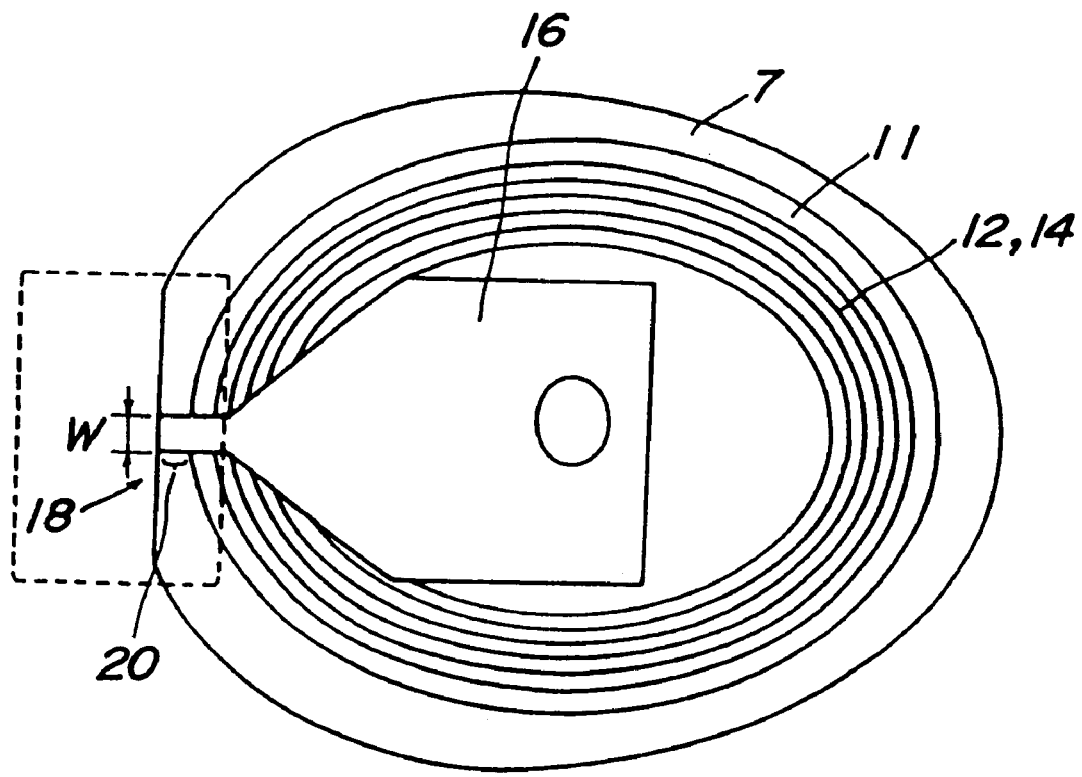
FIG_12
PRIOR ART

FIG._13a
FIG._13b
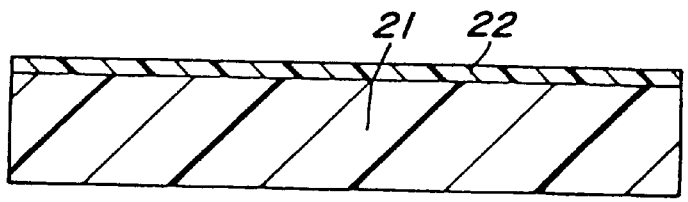
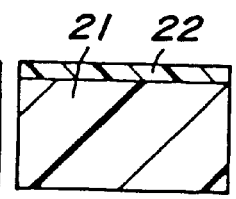
FIG._14a
FIG._14b
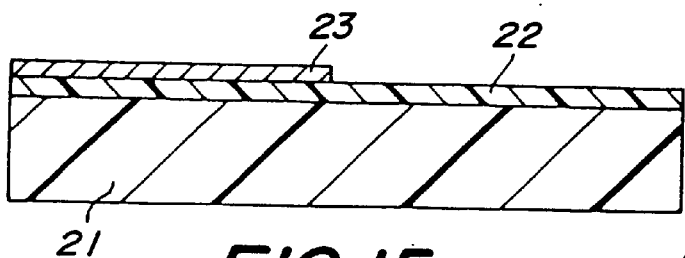
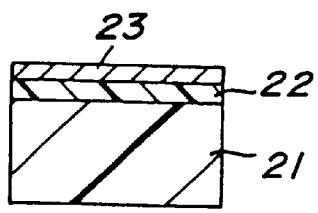
FIG._15a
FIG._15b
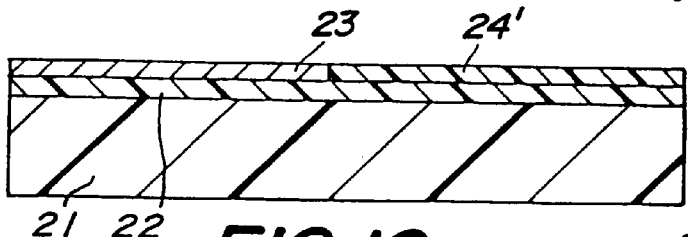
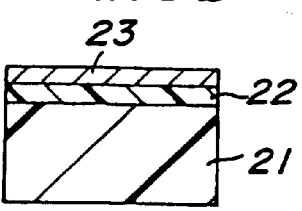
FIG._16a
FIG._16b
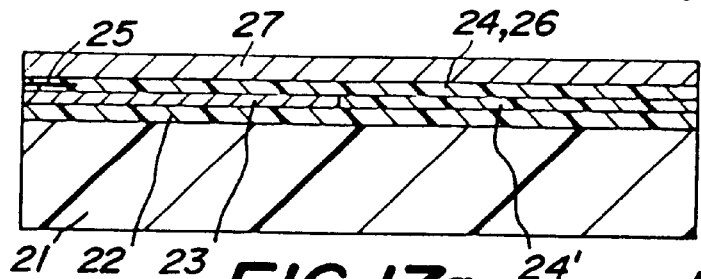
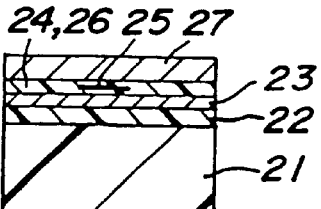
FIG._17a
FIG._17b
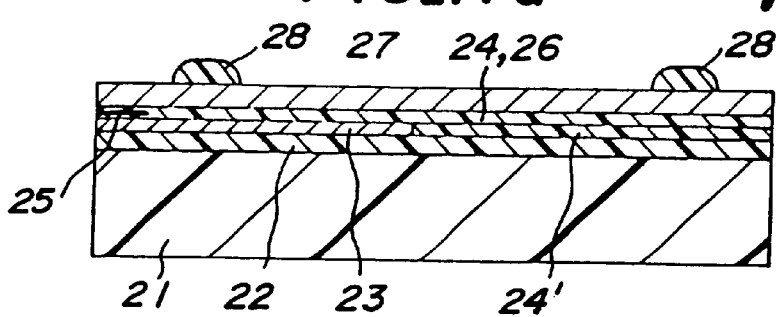
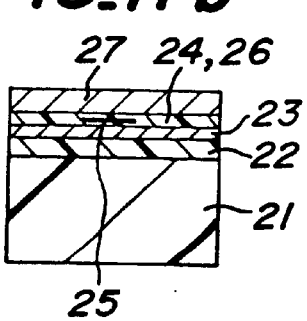

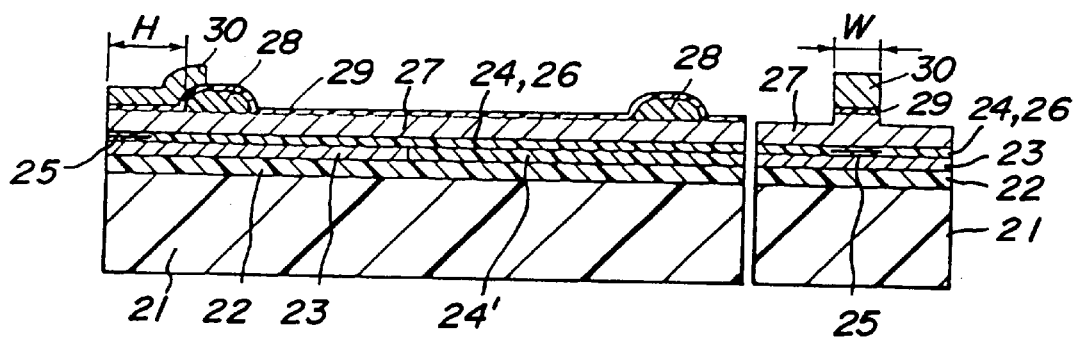
FIG._18a  FIG._18b
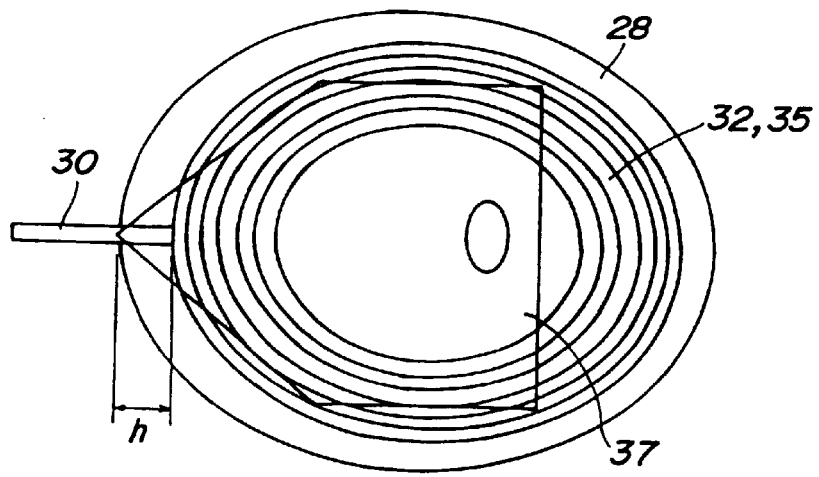
FIG._19
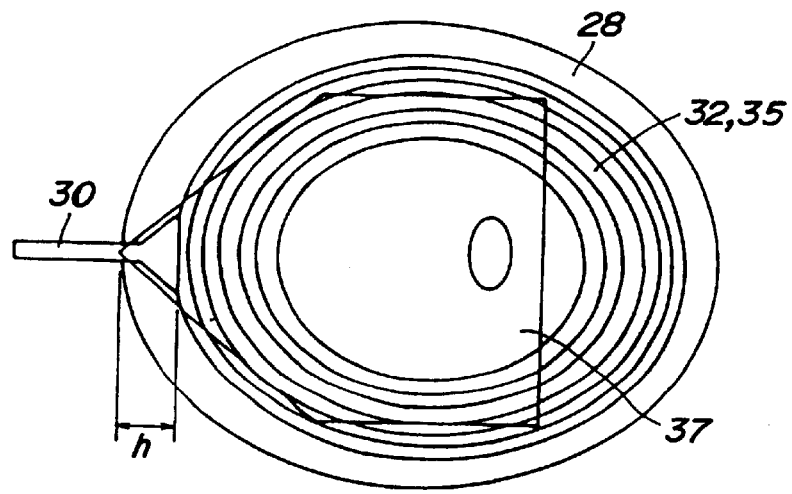
FIG._20

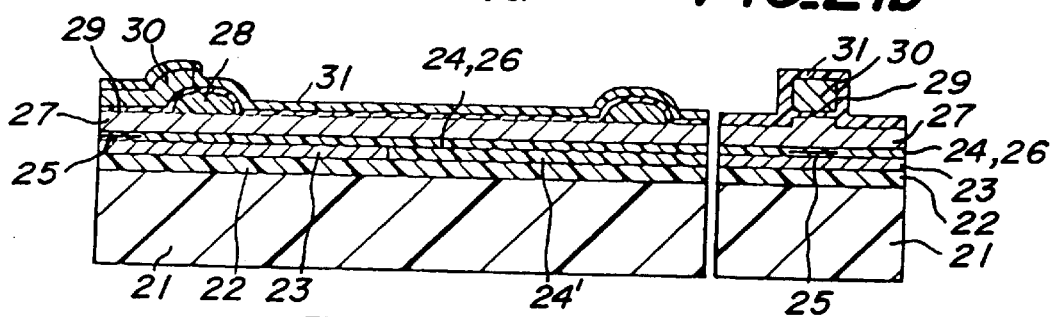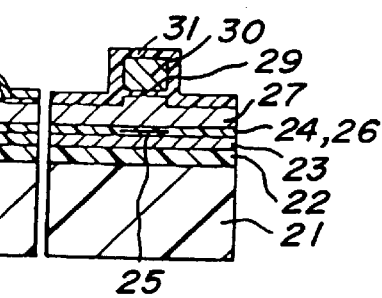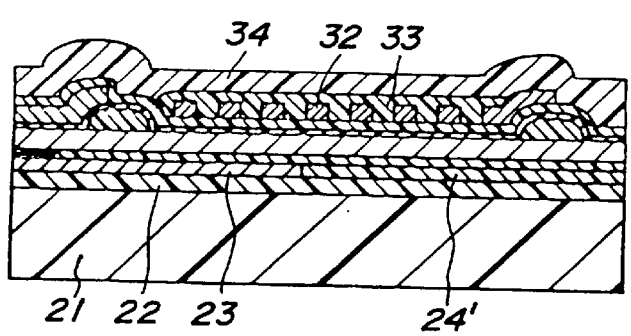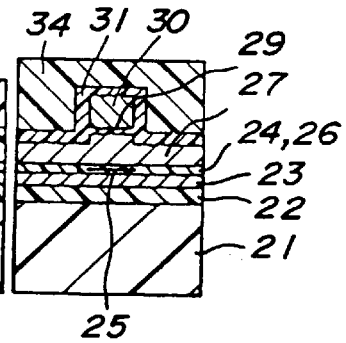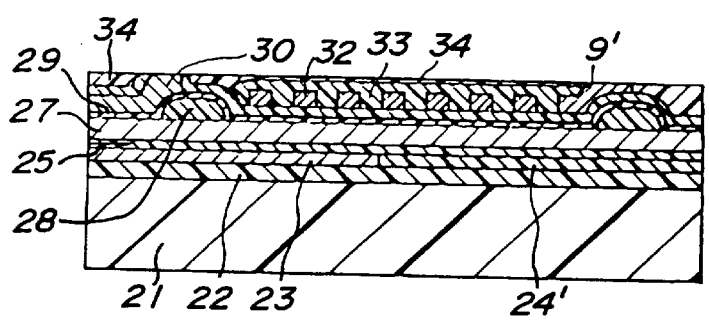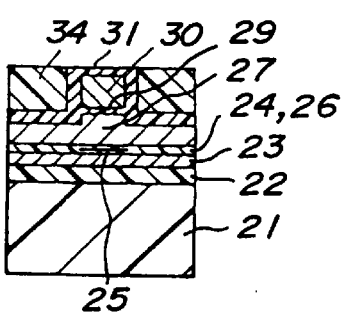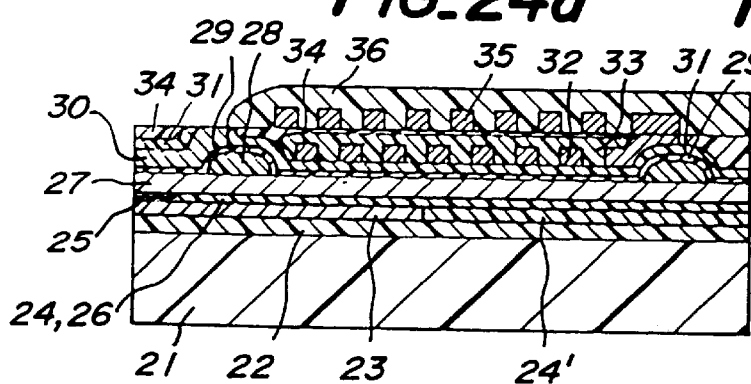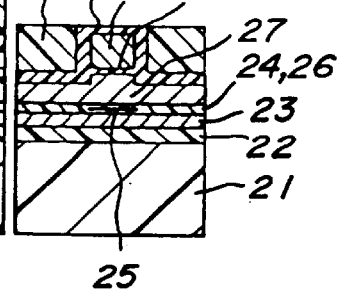

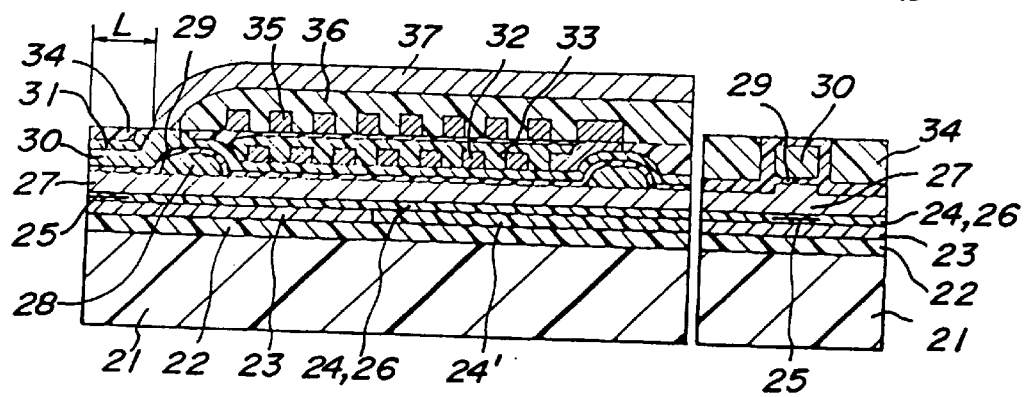
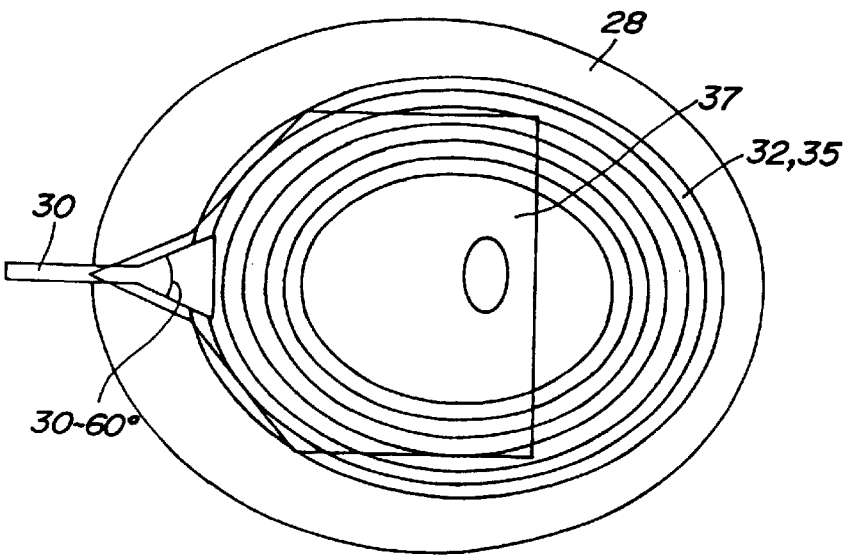
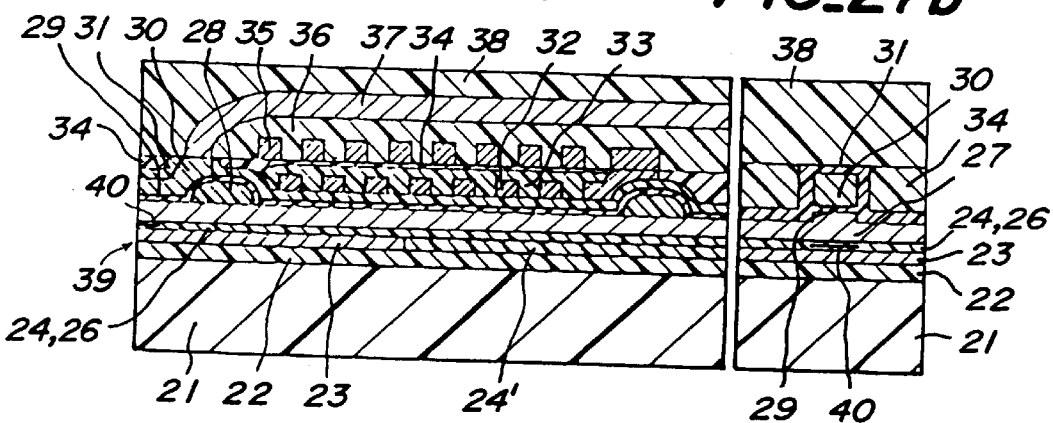

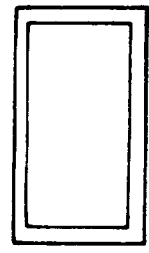
FIG. 30c
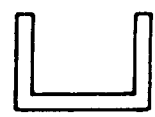
FIG. 30f
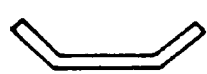
FIG. 30i
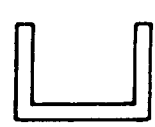
FIG. 30b
FIG. 30e
FIG. 30h
FIG. 30a
FIG. 30d
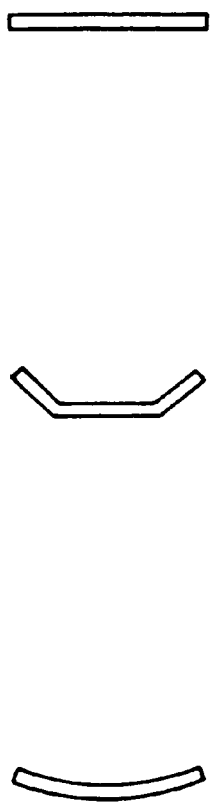
FIG. 30g

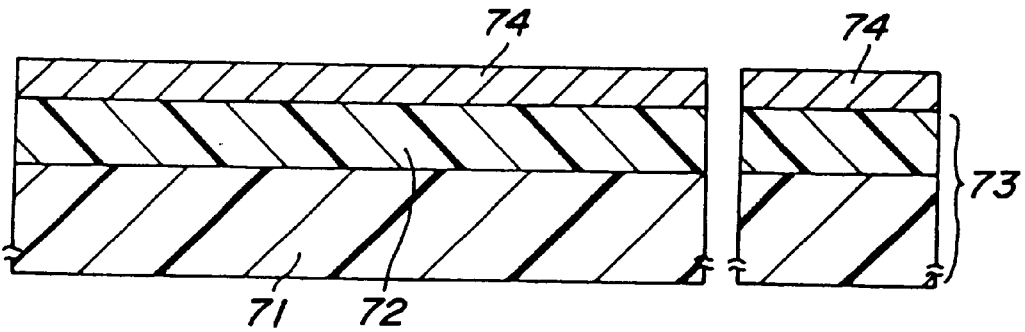
FIG_31a  FIG_31b
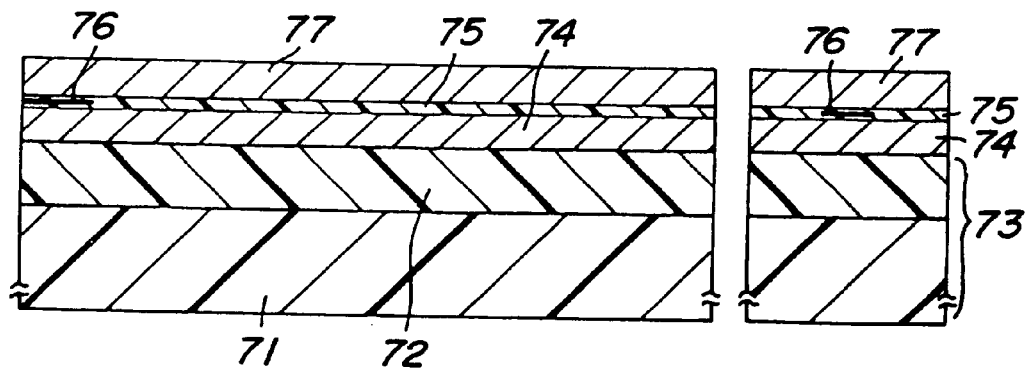
FIG_32a  FIG_32b
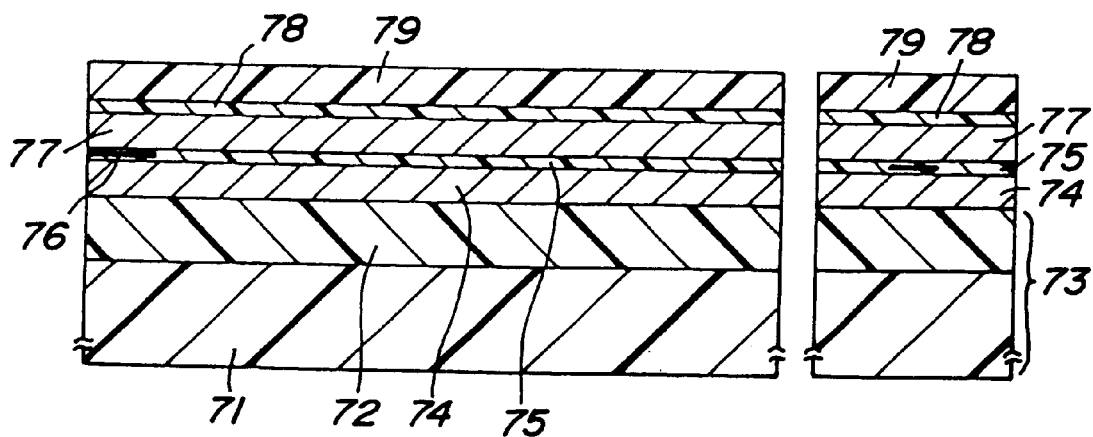
FIG_33a  FIG_33b FIG. 34a
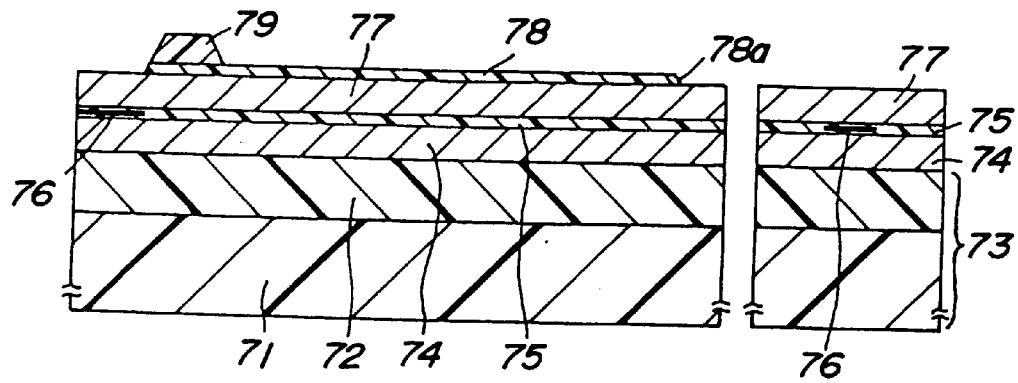
FIG. 34b
FIG. 35
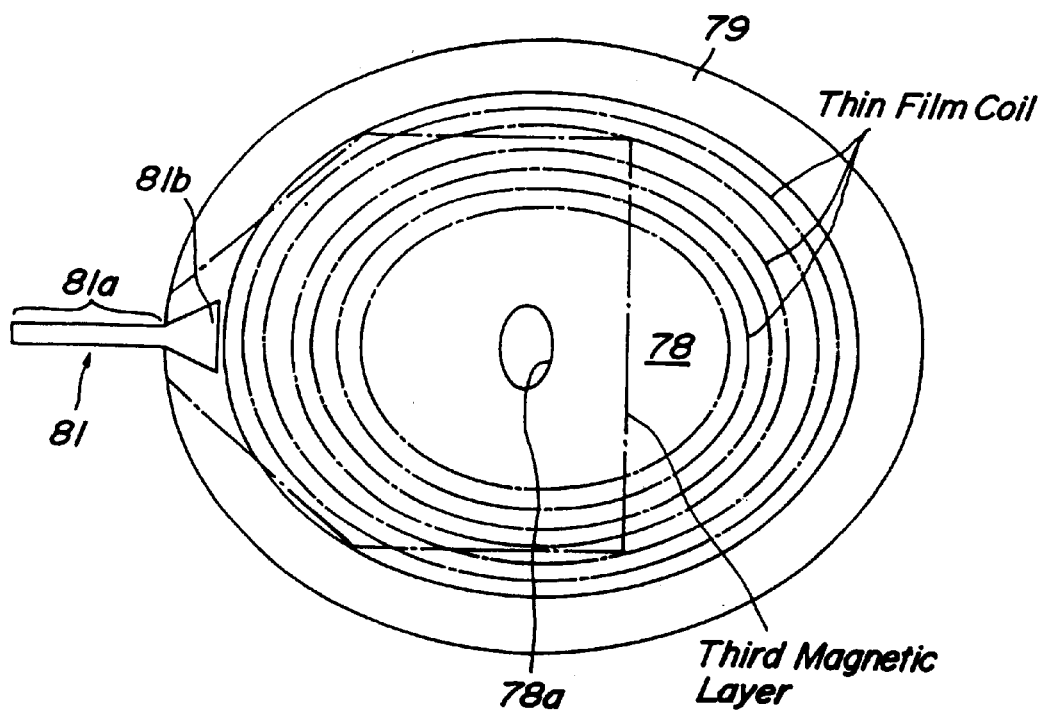

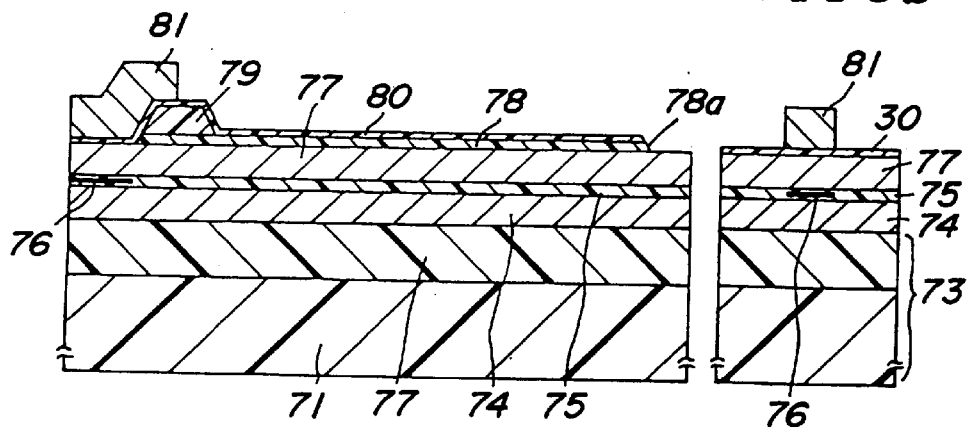
FIG_36a  FIG_36b
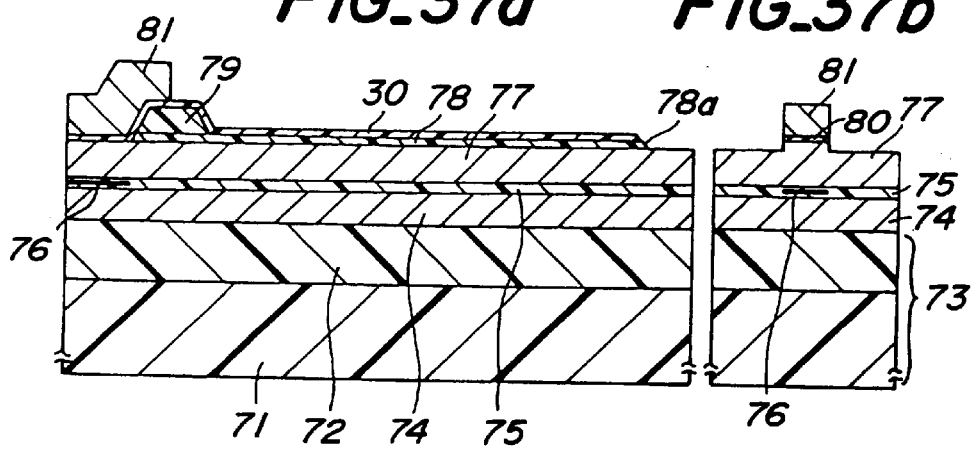
FIG_37a  FIG_37b
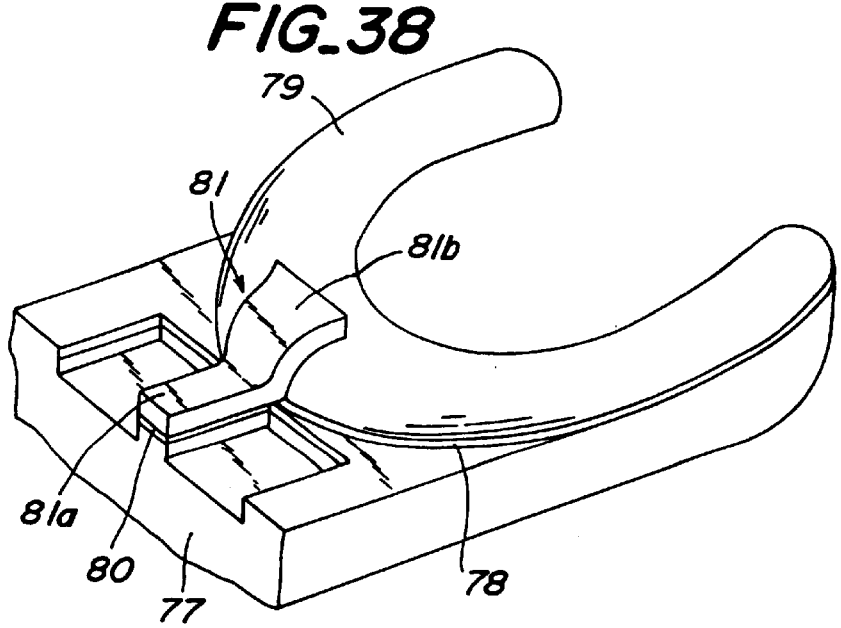
FIG_38

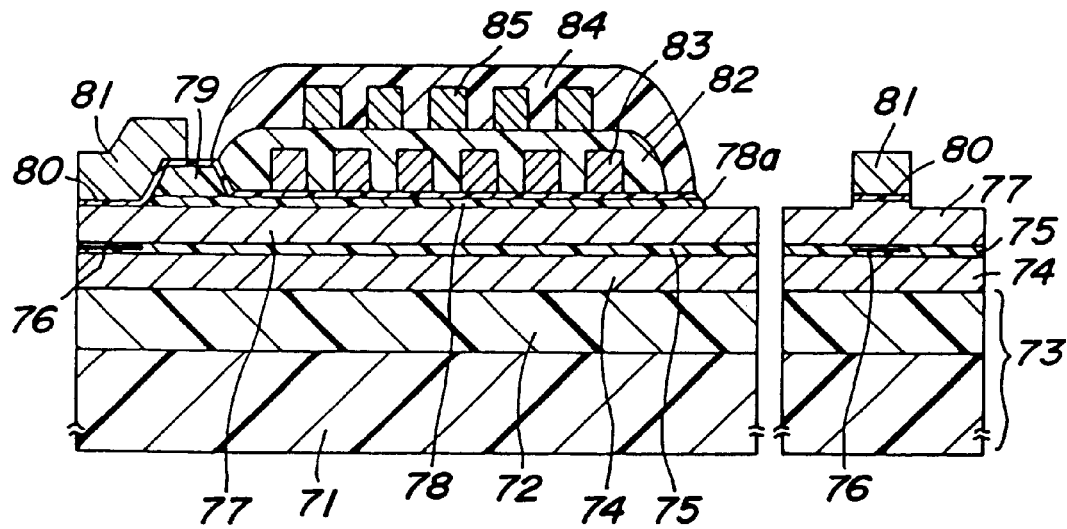
FIG_39a  FIG_39b
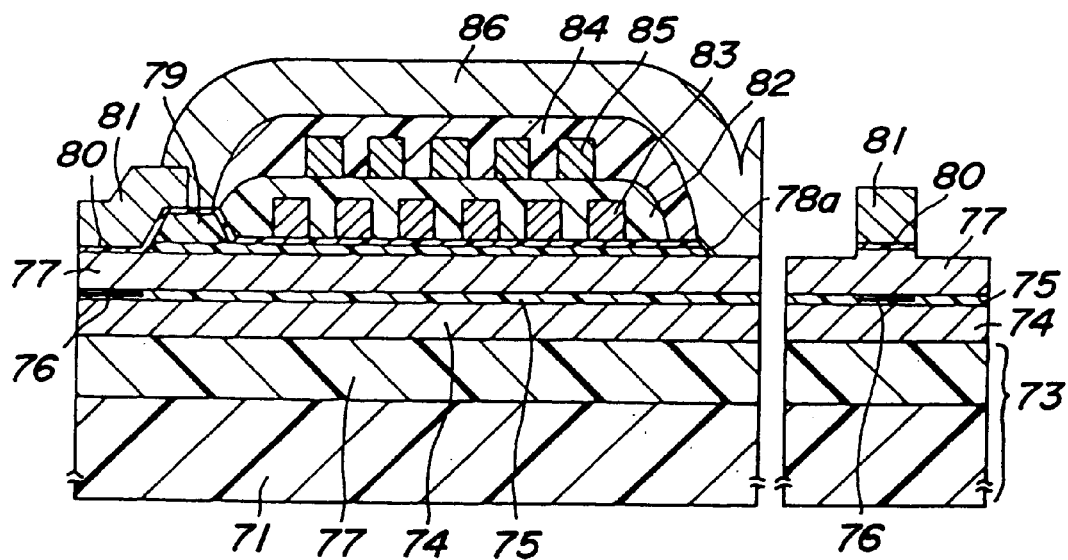
FIG_40a  FIG_40b

FIG_41
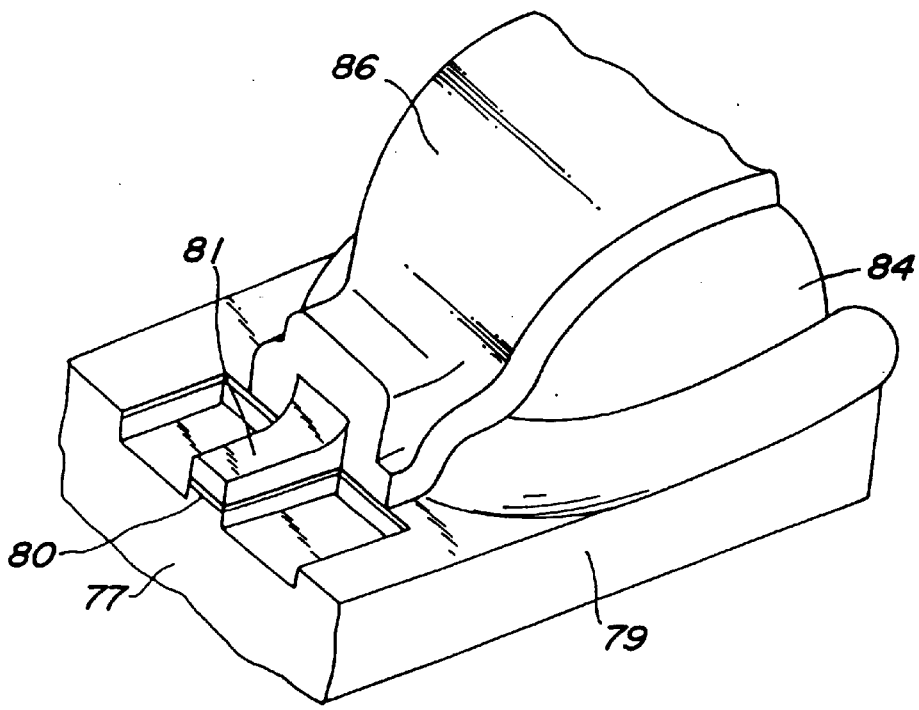
FIG_42a    FIG_42b
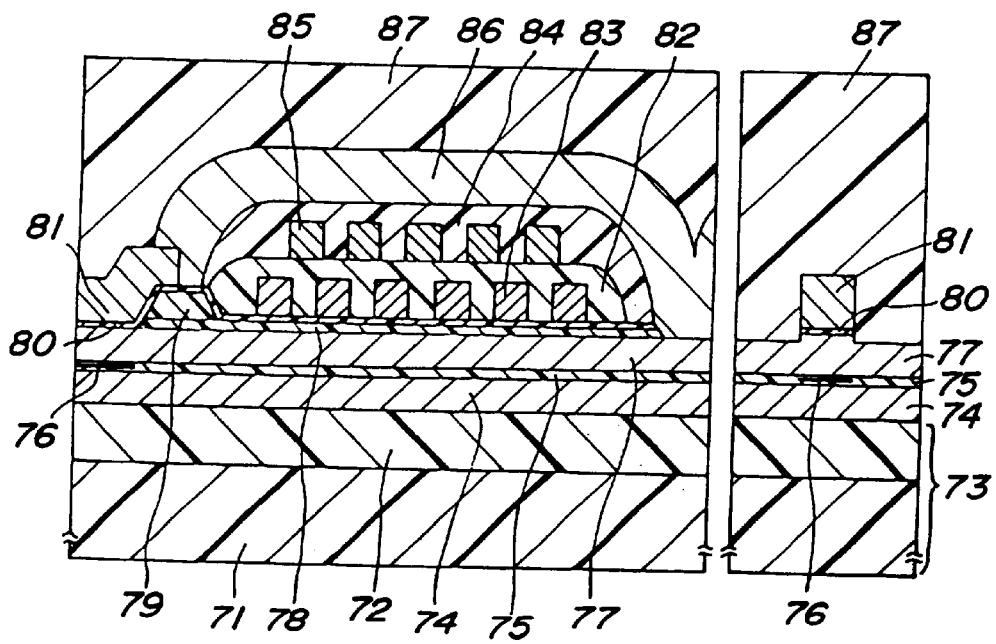

FIG_43
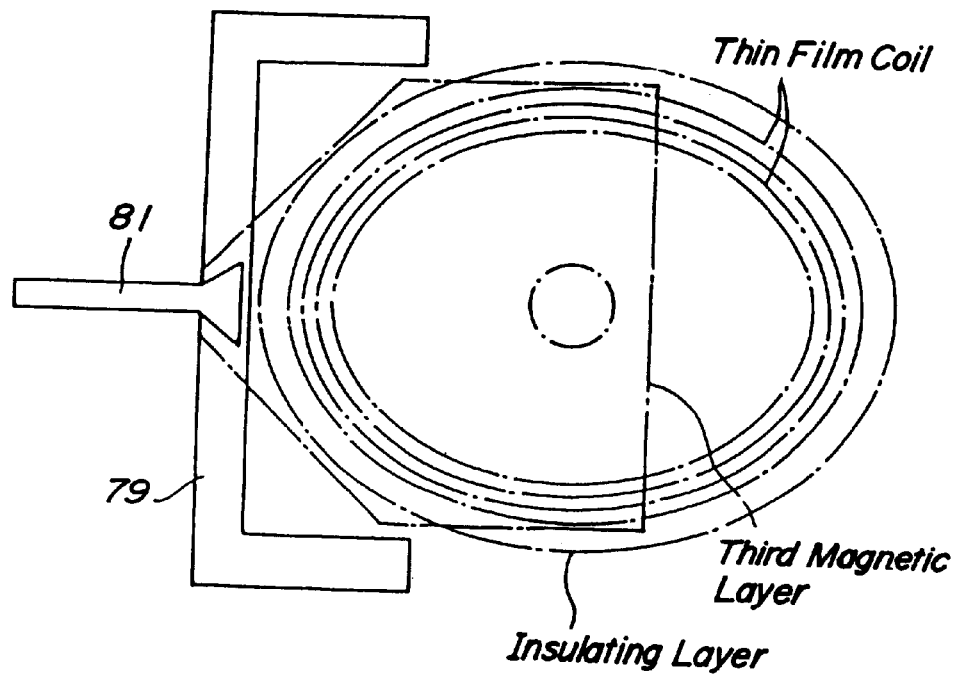
FIG_44
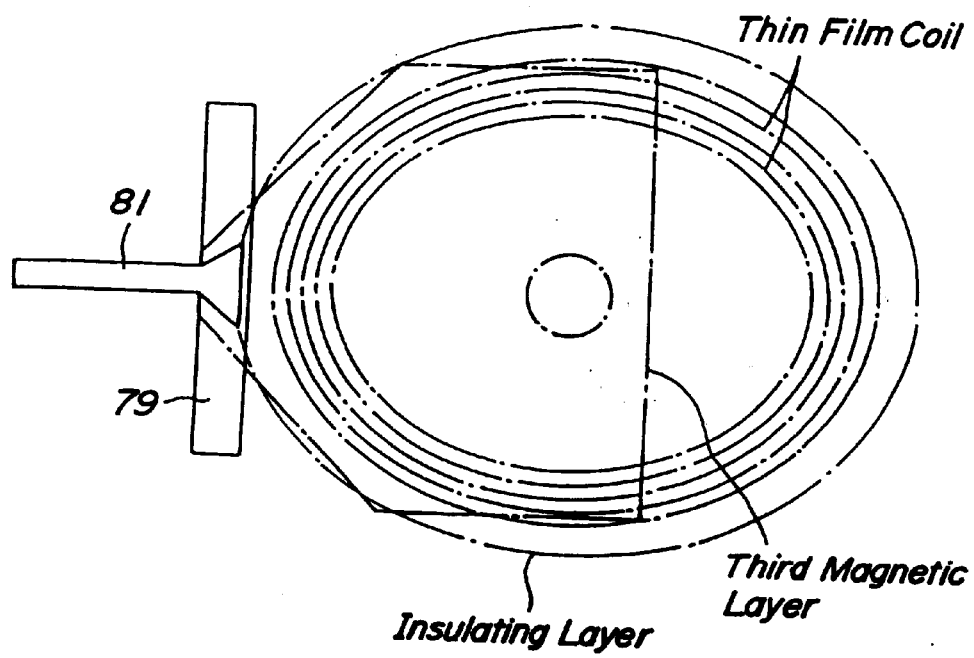

METHOD OF MANUFACTURING A THIN FILM MAGNETIC HEAD

This is a Division of application Ser. No. 09/099,461 filed Jun. 18. 1998, now U.S. Pat. No. 6,130,905. The entire disclosure of the prior application(s) is hereby incorporated by reference herein in its entirety.

BACKGROUND OF THE INVENTION

1. Field of the Invention

The present invention relates to a thin film magnetic head and a method of manufacturing the same, and more particularly to technique of improving a performance of an inductive type thin film writing magnetic head of a composite type thin film magnetic head constructed by stacking the inductive type thin film writing magnetic head and a magnetoresistive type reading magnetic head one on the other.

2. Description of the Related Art

Recently a surface recording density of a hard disc device has been improved, and it has been required to develop a thin film magnetic head having an improved performance accordingly. In order to improve a performance of a reading magnetic head, a reproducing head utilizing a magnetoresistive effect has been widely used. As the reproducing magnetic head utilizing the magnetoresistive effect, an AMR reproducing element utilizing a conventional anisotropic magnetoresistive (AMR) effect has been widely used. There has been further developed a GMR reproducing element utilizing a giant magnetoresistive (GMR) effect having a resistance change ratio higher than the normal anisotropic magnetoresistive effect by several times. In the present specification, these AMR and GMR reproducing elements are termed as a magnetoresistive reproducing element or MR reproducing element.

By using the AMR reproducing element, a very high surface recording density of several gigabits per a unit square inch has been realized, and a surface recording density can be further increased by using the GMR element. By increasing a surface recording density in this manner, it is possible to realize a hard disc device which has a very large storage capacity of more than 10 gigabytes and is still small in size.

A height of a magnetoresistive reproducing element is one of factors which determine a performance of a reproducing head including a magnetoresistive reproducing element. This height is generally called MR Height, here denoted by MRH. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, a performance of a recording head has been also required to be improved. In order to increase a surface recording density, it is necessary to make a track density on a magnetic record medium as high as possible. For this purpose, a width of a pole portion at the air bearing surface has to be reduced to a value within a range from several micron meters to several sub-micron meters. In order to satisfy such a requirement, the semiconductor manufacturing process has been adopted for manufacturing the thin film magnetic head. One of factors determining a performance of an inductive type thin film writing magnetic film is a throat height TH. This throat height TH is a distance of a pole portion measured from the air bearing surface to an edge of an insulating layer which serves to separate electrically a thin film coil from the air bearing surface. It has been required to shorten this distance as small as possible. Also this throat height TH is determined by an amount of polishing the air bearing surface.

FIGS. 1a, 1b–9a, 9b are cross sectional views showing successive steps of a known method of manufacturing a conventional typical thin film magnetic head, said cross sectional views being cut along a plane perpendicular to the air bearing surface and cut along a plane parallel with the air bearing surface. FIGS. 10–12 are a cross sectional view illustrating a completed thin film magnetic head cut along a plane perpendicular to the air bearing surface, a cross sectional view of the pole portion cut along a plane parallel with the air bearing surface, and a plan view depicting the pole portion. This magnetic head belongs to a composite type thin film magnetic head which is constructed by stacking an inductive type thin film writing magnetic head and a magnetoresistive type thin film reading magnetic head one on the other.

At first, as illustrated in FIGS. 1a and 1b, on a substrate 1 made of a hard non-magnetic material such as aluminum-titan-carbon (AlTiC), is deposited an insulating layer 2 made of alumina ($Al_2O_3$) and having a thickness of about 5–10 $\mu$m. Then, as depicted in FIGS. 2a and 2b, a bottom shield layer 3 constituting a magnetic shield for the MR reproducing magnetic head is formed to have a thickness of about 3 $\mu$m on the insulating layer.

Then, after depositing by sputtering a shield gap layer 4 made of an alumina with a thickness of 100–150 nm as shown in FIGS. 3a and 3b, a magnetoresistive layer 5 having a thickness of several tens nano meters and being made of a material having the magnetoresistive effect, and the magnetoresistive layer is shaped into a desired pattern by a highly precise mask alignment.

Next, as represented in FIGS. 4a and 4b, a shield gap layer 6 is formed such that the electromagnetic layer 5 is embedded within the shield gap layers 4, 6.

Then a magnetic layer 7 made of a permalloy and having a thickness of 3 $\mu$m is formed as shown in FIGS. 5a and 5b. This magnetic layer 7 serves not only as an upper shield layer for magnetically shielding the MR reproducing element together with the above mentioned bottom shield layer 3, but also as a bottom magnetic layer of the inductive type writing thin film magnetic head to be manufactured later. Here, for the sake of explanation, the magnetic layer 7 is called a first magnetic layer, because this magnetic layer constitutes one of magnetic layers forming the thin film writing magnetic head.

Next, after forming, on the first magnetic layer 7, a write gap layer 8 made of a nonmagnetic material such as alumina to have a thickness of about 200 nm, a second magnetic layer 8 made of a magnetic material having a high saturated magnetic flux density such as a permalloy (Ni: 50 wt %, Fe: 50 wt %) and iron nitride (FeN) and the second magnetic layer is shaped into a desired pattern by means of a precise mask alignment.

This second magnetic layer 24 having a desired pattern is called a pole chip and a track width is determined by a width of the pole chip.

During this process, a dummy pattern 9' for connecting the bottom pole (first magnetic layer) to an upper pole (third magnetic layer) to be formed later is formed. Then a through hole can be easily formed after mechanical polishing or chemical-mechanical polishing (CMP).

In order to prevent an increase of an effective track width, that is, in order to prevent a spread of a magnetic flux at the lower pole during a writing operation, the gap layer 8 and bottom pole (first magnetic layer) near the pole chip 9 are removed by an ion beam etching such as an ion milling. This condition is illustrated in FIG. 5, and this structure is called a trim structure. It should be noted that this portion constitutes the pole portion of the first magnetic layer.

Next, as illustrated in FIGS. 6a and 6b, an insulating layer 10 such as an alumina layer is formed to have a thickness of about 3 μm, and then an assembly is flattened by, for instance CMP.

After that, an electrically insulating photo-resist layer 11 is formed in accordance with a given pattern by a highly precise mask alignment, and then a first layer of a thin film coil 12 made of, for instance copper is formed on the photo-resist layer 11.

Next, as depicted in FIGS. 7a and 7b, an insulating photo-resist layer 13 is formed on the thin film coil 12 by a highly precise mask alignment, a surface is flattened by baking at a temperature of, for instance 250–300° C.

Furthermore, as shown in FIGS. 8a and 8b, on the thus flattened surface of the photo-resist layer 13, a second layer thin film coil 14 is formed. Then, a photo-resist layer 15 is formed on the second layer thin film coil 14 by a highly precise mask alignment, and a baking process is carried again at a temperature of, for instance 250° C.

A reason for forming the photo-resist layers 11, 13 and 15 by a highly precise mask alignment is that the throat height TH and MR height are determined with respect to edges of these photo-resist layers on a side of the pole portion.

Next, as shown in FIGS. 9a and 9b, a third magnetic layer 16 made of, for instance a permalloy is formed on the second magnetic layer (pole chip) 9 and photo-resist layers 11, 13 and 15 such that the third magnetic layer has a thickness of 3 μm and is shaped into a desired pattern.

The third magnetic layer 16 is brought into contact with the first magnetic layer 7 at a position remote from the pole portion by means of the dummy pattern 9', and therefore the thin film coil 12, 14 pass through a closed magnetic yoke structure constituted by the first, second and third magnetic layers.

Furthermore, an overcoat layer 25 made of an alumina is deposited on an exposed surface of the third magnetic layer 16.

Finally, a side wall at which the magnetoresistive layer 5 and gap layer 8 are formed is polished to form an air bearing surface (ABS) 18. During the formation of the air bearing surface 18, the magneto-resistive layer 5 is also polished to obtain an MR reproducing element 19. In this manner, the above mentioned throat height TH and MR height MRH are determined by the polishing. This condition is shown in FIG. 10. In an actual manufacturing process, contact pads for establishing electrical connections to the thin film coils 12, 14 and MR reproducing element 19 are formed, but these contact pads are not shown in the drawings.

As shown in FIG. 10, an angle θ between a straight line S connecting side edges of the photo-resist layers 11, 13 and 15 isolating the thin film coils 12, 14 and an upper surface of the third magnetic layer 16 is called an apex angle. This apex angle is one of important factors for determining a property of the thin film magnetic head together with the throat height TH and MR height MRH.

Furthermore, as shown in the plan view of FIG. 12, a width W of the pole portion 20 of the second magnetic layer 9 and third magnetic layer 16 is small. A width of tracks recorded on a record medium is determined by said width W, and therefore it is necessary to make this width W as small as possible in order to realize a high surface recording density. It should be noted that in the drawing, the thin film coils 12, 14 are denoted to be concentric for the sake of simplicity.

In the known method of manufacturing the thin film magnetic head, there is a special problem in the formation of the upper pole (yoke pole) after the formation of the thin film coil in a precise manner along the outwardly protruded coil portion, particularly along an inclined portion (apex) thereof, said coil portion being covered with the photo-resist insulating layers. That is to say, in the known method, upon forming the upper pole, after an upper pole material such as permalloy is deposited by plating on the outwardly protruded coil portion having a height of about 7–10 μm, a photo-resist is applied to have a thickness of 3–4 μm, and then the layer is shaped into a given pattern by utilizing the photolithography. Since a thickness of the photo-resist layer provided on the upper portion of the coil portion should be at least 3 μm, the photo-resist layer has to be applied such that a portion of the photo-resist at a bottom of the outwardly protruded coil portion would have a thickness of 8–10 μm.

On the other hand, in order to form a narrow track of the recording head near the edges of the photo-resist insulating layers (for instance, layers 11 and 13 in FIG. 7), the upper pole formed on the write gap layer provided on the surface of the outwardly protruded coil portion as well as on the flat surface should be patterned to have a width of about 1 μm, said coil portion and flat portion having a level difference of about 10 μm. Therefore, it is necessary to form the photo-resist layer having a thickness of 8–10 μm and a pattern having a width of 1 μm.

However, when a narrow pattern having a width of 1 μm is to be formed with the thick photo-resist layer having a thickness of 8–10 μm, a top pole which can realize a narrow track could hardly be manufactured accurately due to a deformation of a pattern by light reflection during a light exposure in a photolithography and an inevitable decrease in a resolution caused by a large thickness of the photo-resist layer.

Under the above circumstances, as shown in the above explained known method, the above problem has been solved by writing data with the aid of the pole chip which can realize a narrow track width and after forming the pole chip, the upper pole is connected to the pole chip. That is to say, the division structure is adopted, in which the upper yoke is divided into the pole chip defining the track width and the upper pole for introducing a magnetic flux into the pole chip.

However, the thin film magnetic head, particularly the recording magnetic head formed in the above mentioned manner still has the following problems.

(1) The throat height TH and MR height MRH are determined, while the edge of the insulating layer isolating the thin film coil on a side of the pole portion is used as a positional reference, and the insulating layer is generally made of an organic insulating photo-resist layer and thus is liable to be affected by heat. Therefore, the insulating film is liable to be melt or softened by the heating treatment at about 250° C. during the formation of the thin film coil, and a pattern of the insulating layer might be deformed. Moreover, a reference position of zero throat height is determined by an end of the pole chip 9 opposite to the air bearing surface 18, and the edge of the pole chip pattern is rounded off due to a fact that the pole chip has a narrow width W, and therefore a position of the end of the pole chip might be shifted. In this manner, in the composite type thin film magnetic head, it is difficult to determine the reference position of throat height zero accurately, and thus the thin film magnetic head having desired throat height TH and MR height MRH according to the desired design values could not be manufacture with a high yield.

(2) The surface of the pole chip 9 is coupled with the surface of the third magnetic layer 16. In order to make the width W of the pole chip narrow as explained above and in order to attain a good magnetic property, a length of the pole chip has to be short such as about 1 μm. Therefore, a contact area of the pole chip and third magnetic layer is small. Moreover, the third magnetic layer is brought into contact with the pole chip perpendicularly, and thus a magnetic flux is liable to be saturated at this portion, a writing property, particularly a magnetic flux rise time is degraded.

(3) If there is an alignment error in the photolithography for forming the third magnetic layer 16 on the pole chip 9 having the narrow width W, a center of the pole chip 9 and a center of the pole portion 20 of the third magnetic layer 16 viewed from the air bearing surface might be shifted relative to each other. If the center of the pole chip 9 is deviated from the center of the pole portion 20 of the third magnetic layer 16, there might be produced a large leakage of the magnetic flux from the pole portion of the third magnetic layer and data might be written by this leaked magnetic flux. Therefore, an effective track width is increased and data might be recorded in a region other than a desired region into which the data has to be recorded.

SUMMARY OF THE INVENTION

The present invention has for its object to provide a thin film magnetic head, in which the above mentioned problems can be solved and the insulating layer constituting a positional reference for the air bearing surface is not melt or softened by a heating treatment for forming the thin film coil at a temperature of about 250° C., and thus the throat height TH and MR height MRH accurately corresponding to desired design values can be obtained stably.

It is another object of the invention to provide a thin film magnetic head, in which a surface area at a contact with the pole chip and the upper pole can be effectively increased, and therefore undesired saturation of the magnetic flux at the pole portion can be prevented.

It is another object of the invention to provide a thin film magnetic head, in which undesired increases in an effective track width and in a manufacturing yield can be mitigated.

It is another object of the invention to provide a thin film magnetic head, in which a track width can be reduced by decreasing a height of the thin film coil, and the number of coil windings can be effectively increased.

It is another object of the invention to provide a method of manufacturing the thin film magnetic head having the above mentioned superior characteristics in an accurate manner with a high yield.

According to the invention, a thin film magnetic head comprises:

a first magnetic layer having a pole portion;

a second magnetic layer having a pole portion whose end surface constitutes an air bearing surface together with said pole portion of the first magnetic layer, said pole portion of the second magnetic layer having a width defining a width of a record track on a magnetic record medium to be opposed to the air bearing surface;

a third magnetic layer which is brought into contact with said second magnetic layer on a side opposite to said first magnetic layer and is magnetically coupled with said first magnetic layer at a rear position remote from the air bearing surface;

a gap layer made of a non-magnetic material and being interposed at least between said pole portion of the first magnetic layer and said pole portion of the second magnetic layer;

a thin film coil having a portion which is supported by an insulating material in an electrically isolated manner between said first magnetic layer and said second and third magnetic layers; and a substrate supporting said first, second and third magnetic layers, gap layer and thin film coil;

wherein a band-shaped or strip-shaped insulating layer having at least a portion whose edge on a side of the pole portion defines a reference position for the air bearing surface is provided on said first magnetic layer, at least a surface of said insulating layer opposing to said first magnetic layer is covered with the non-magnetic material constituting said gap layer, and said thin film coil is provided in a rear region with respect to said insulating layer.

In the thin film magnetic head according to the invention, the third magnetic layer may be coupled with said second magnetic layer only at the surface of the second magnetic layer or at the surface and side walls of the second magnetic layer or at the surface, side walls and end surface of the second magnetic layer.

According to the invention, said insulating layer may have various plan configuration, but it is most preferable to form the ring-shaped insulating layer and the thin film coil is arranged in an inner area of the ring. Furthermore, the band-shaped insulating layer may be preferably made of an inorganic insulating material such as alumina, silicon oxide and silicon nitride.

In a preferable embodiment of the thin film magnetic head according to the invention, said second magnetic layer is formed such that it extends not only over the pole portion of the first magnetic layer, but also over the band-shaped insulating layer situating behind the pole portion. In this case, it is preferable to gradually increase a width of the second magnetic layer on the band-shaped insulating layer. A widening angle of the rear portion of the second magnetic layer is preferably made identical with that of the third magnetic layer, said angle being 30–180°.

In the thin film magnetic head according to the invention, it is preferable to make said second magnetic layer of a magnetic material having a high saturation flux density such as permalloy (Ni: 50 Wt %, Fe 50 Wt %), iron nitride (FeN), Fe—Cr—Zr based amorphous alloy and Fe—C based amorphous alloy.

In a preferable embodiment of the thin film magnetic head according to the invention, a front end of said third magnetic layer is retarded from the air bearing surface such that a contact portion between the second magnetic layer and the third magnetic layer is not exposed on the air bearing surface. In this case, it is preferable to make a retarding distance of the front end of the third magnetic layer substantially equal to the throat height TH.

Furthermore, in another preferable embodiment of the thin film magnetic head according to the invention, the thin film magnetic head is constructed as a composite type thin film magnetic head by providing a reading magnetoresistive element in an electrically insulated and magnetically shielded manner such that an edge of the magnetoresistive element is exposed on said air bearing surface.

According to the invention, a method of manufacturing a thin film magnetic head comprises the steps of:

forming a first magnetic layer having a pole portion such that the first magnetic layer is supported by a substrate;

forming a band-shaped insulating layer on said first magnetic layer, said insulating layer having at least a portion whose edge defines a reference position for an air bearing surface;

forming a gap layer made of a non-magnetic material on at least said pole portion of the first magnetic layer and on said insulating layer;

forming a second magnetic layer on said gap layer at least at a portion which situates on said first magnetic layer;

forming a thin film coil in a rear region on a side of the band-shaped insulating layer opposite to said air bearing surface such that the thin film coil is supported by an insulating material in an electrically isolated manner;

forming a third magnetic layer such that the third magnetic layer is coupled with said second magnetic layer as well as with said first magnetic layer at a rear portion opposite to said air bearing surface; and polishing the substrate, pole portions of the first and second magnetic layers and gap layer sandwiched by these magnetic layers to form the air bearing surface which is to be opposed to a magnetic record medium.

In the method of manufacturing the thin film magnetic head according to the invention, the third magnetic layer may be coupled with the surface of the second magnetic layer or with the surface and side walls of the second magnetic layer or with the surface, side walls and end surface of the second magnetic layer.

In the method of manufacturing the thin film magnetic head according to the invention, it is preferable to form said second magnetic layer such that not only the pole portion of the first magnetic layer, but also the insulating layer behind the pole portion are covered with the second magnetic layer. In this case, it is preferable to increase gradually a width of the rear portion of the second magnetic layer.

In a preferable embodiment of the method of manufacturing the thin film magnetic head according to the invention, said band-shaped insulating layer is formed as a ring-shape, and prior to the formation of the thin film coil, a surface of the second magnetic layer, a surface of the ring-shaped insulating layer and an inner area surrounded by the ring-shaped insulating layer are covered with a non-magnetic and non-conductive film. In this case, it is particularly preferable to polish the surface of the rear portion of the second magnetic layer and a surface of the non-magnetic and non-conductive film such that these surfaces become co-planer. By proving such a flat surface, the thin film coil can be formed much more accurately.

In the method of manufacturing the thin film magnetic head according to the invention, it is preferable to form said third magnetic layer such that a front end of the third magnetic layer is retarded from the air bearing surface and a contact portion of the second and third magnetic layers is not exposed on the air bearing surface.

Moreover, in the method of manufacturing the thin film magnetic head according to the invention, it is also possible to constitute a composite type thin film magnetic head by forming a magnetoresistive reproducing element between said substrate and said first magnetic layer such that the element is magnetically shielded and electrically isolated. In this case, a first shield layer is formed on the substrate, the magnetoresistive material layer embedded within a shield gap layer is formed on the first shield layer, and said first magnetic layer also serving as a second shield layer is formed. During a polishing step for forming the air bearing surface, said magnetoresistive material layer as well as the first shield layer and shield gap layer are polished to form the magnetoresistive reproducing element having an edge exposed on the air bearing surface.

BRIEF DESCRIPTION OF THE DRAWINGS

FIGS. 1a, 1b–9a, 9b are cross sectional views cut along a plane perpendicular to the air bearing surface as well as a plane parallel with the air bearing surface and showing successive steps of manufacturing a known composite type thin film magnetic head;

FIG. 10 is a cross sectional view of the completed known thin film magnetic head cut along a plane perpendicular to the air bearing surface;

FIG. 11 a cross sectional view showing the pole portion of the completed known thin film magnetic head cut along a plane perpendicular to the air bearing surface;

FIG. 12 is a plan view illustrating the completed known thin film magnetic head;

FIGS. 13a, 13b–18a, 18b are cross sectional views cut along a plane perpendicular to the air bearing surface as well as along a plane parallel with the air bearing surface showing successive steps of an embodiment of the thin film magnetic head manufacturing method according to the invention;

FIG. 19 is a plan view illustrating a second magnetic layer shown in FIG. 18;

FIG. 20 is a plan view depicting another embodiments of the second magnetic layer;

FIGS. 21a, 21b–25a, 25b are cross sectional views cut along a plane perpendicular to the air bearing surface as well as along a plane parallel with the air bearing surface showing succeeding steps;

FIG. 26 is a plan view illustrating a shape of the third magnetic layer suitable for the second magnetic layer;

FIGS. 27a and 27b are cross sectional views cut along a plane perpendicular to the air bearing surface as well as a plane parallel with the air bearing surface showing a completed thin film magnetic head according to the invention;

FIGS. 30a–30i are plan views showing several embodiments of the band-shaped insulating layer provided in the thin film magnetic head according to the invention;

FIGS. 31a, 31b–34a, 34b are cross sectional views.cut along a plane perpendicular to the air bearing surface as well as along a plane parallel with the air bearing surface illustrating successive steps of a second embodiment of the method of manufacturing the composite type thin film magnetic head according to the invention;

FIG. 35 is a plan view depicting a condition shown in FIG. 34;

FIGS. 36a, 36b and 37a, 37b are cross sectional views cut along planes perpendicular to and parallel with the air bearing surface showing succeeding steps;

FIG. 38 is a perspective view illustrating a condition shown in FIG. 37;

FIGS. 39a, 39b and 40a, 40b are cross sectional views cut along planes perpendicular to and parallel with the air bearing surface showing succeeding steps;

FIG. 41 is a perspective view illustrating a condition shown in FIG. 40;

FIGS. 42a and 42b are cross sectional views cut along planes perpendicular to and parallel with the air bearing surface showing a completed thin film magnetic head;

FIG. 43 is a plan view depicting a shape of the band-shaped insulating layer in another embodiment of the thin film magnetic head according to the invention;

FIG. 44 is a plan view showing the band-shaped insulating layer in another embodiment of the thin film magnetic head according to the invention.

DESCRIPTION OF THE PREFERRED EMBODIMENT

Figure 28:
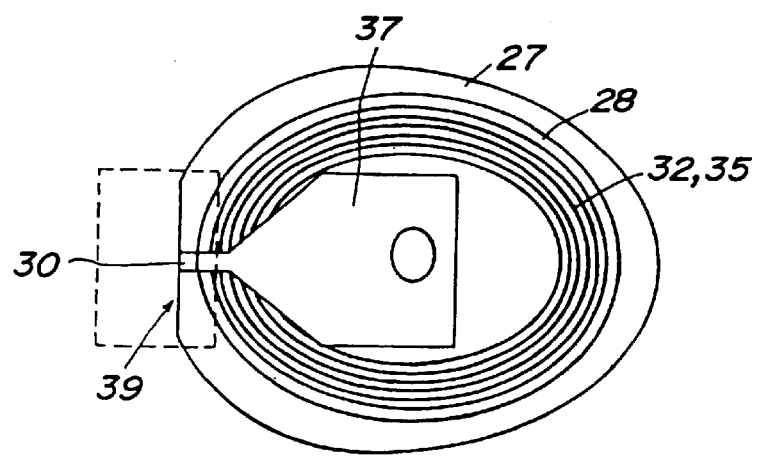
FIG. 28 is a plan view illustrating the completed thin film magnetic head according to the invention.

FIGS. 13–26 show successive steps of an embodiment of the method of manufacturing the thin film magnetic head according to the invention, and FIGS. 27 and 28 are longitudinal cross sectional view and plan view, respectively showing a completed thin film magnetic head according to the invention. In the drawings showing the steps, (a) represents a cross sectional view cut along a plane perpendicular to an air bearing surface and (b) illustrates a cross sectional view cut along a plane parallel with the air bearing surface. The thin film magnetic head of the present embodiment is constructed as a composite type thin film magnetic head having an inductive type writing magnetic head and a MR reproducing element stacked one on the other.

At first, as shown in FIGS. 13a and 13b, on a substrate 21 made of an AlTiC, is deposited an insulating layer 42 made of an alumina having a thickness of about 3–5 μm.

Next, as shown in FIGS. 14a and 14b, on the alumina insulating layer 22, a permalloy layer constituting a lower magnetic shield layer 23 is deposited to have a thickness of about 3 μm by using a photo-resist film as a mask by means of sputtering.

Next, an insulating layer 24' made of an alumina is formed to have a thickness of about 4–6 μm as illustrated in FIGS. 15a and 15b and a surface of this insulating layer is flattened by, for instance CMP. Then, a shield gap layer 24 made of an alumina is deposited by sputtering to have a thickness of 100–200 nm as illustrated in FIGS. 16a and 16b, and then a magnetoresistive layer 25 forming the MR reproducing element is formed to have a thickness of several tens nano meters and the magnetoresistive layer is patterned into a desired shape by means of a highly precise mask alignment. After that a shield gap film 26 is formed such that the magnetoresistive layer 25 is embedded within the shield gap layers 24, 26. Then, a first magnetic layer 27 having a thickness of about 3–4 μm is selectively formed.

After that, in order to remove any step, an alumina layer having a thickness of 5–6 μm is formed on a whole surface, and then this alumina layer is processed by CMP to expose the surface of the first magnetic layer 27.

Next, a band-shaped insulating layer 28 is formed by means of a photo-resist to have a thickness of 2–5 μm and a width of 3–7 μm, said insulating layer including at least a portion whose edge opposing to the pole portion defines a reference position with respect to the throat height TH and apex angle. In the present embodiment, said band-shaped insulating layer is formed as a ring-shaped insulating layer, but according to the invention, it is always necessary to form the ring-shaped insulating layer. That is to say, it is sufficient for the band-shaped insulating layer 28 to have the portion which defines the reference position with respect to the throat height TH, and thus an inner portion of the ring-shaped insulating layer is not necessary. However, when the ring-shaped insulating layer 28 having the inner portion is formed, the thin film coil can be manufactured accurately in a later step.

Next, as shown in FIGS. 18a and 18b, a write gap layer 29 made of an alumina and having a thickness of 100–300 nm is formed at least on the pole portion of the first magnetic layer 36 and ring-shaped insulating layer 28. In this case, it is preferable to cover an inner area of the band-shaped insulating layer 28 with a non-magnetic layer constituting the write gap layer 29, because an insulation from the first magnetic layer can be maintained. When the surface of the band-shaped insulating layer 28 is covered with the alumina insulating layer 29, the following merit can be obtained.

The throat height TH is defined as a distance between the air bearing surface and the edge of the ring-shaped insulating layer 28 on a side of the pole portion, but in actual manufacturing, since the edge of the insulating layer could not been seen, it is assumed that said edge is formed at a desired position and the air bearing surface is polished such that a desired throat height TH can be obtained by using this edge position as the reference position.

On the other hand, during a later step of forming the thin film coil, a heating treatment is carried out at about 250° C., and during this heating treatment, the photo-resist layer constituting the ring-shaped insulating layer 28 is melt and a pattern size of the insulating layer is shifted. Therefore, a position of the above mentioned edge of the photo-resist insulating layer 28 is also shifted, and thus a size of the throat height TH formed by taking the edge position as the reference position might be deviated from a desired design value.

The MR height MRH which is defined as a height of the magnetoresistive reproducing element measured from the air bearing surface is also determined by an amount of polishing the air bearing surface like as the throat height TH. This polishing is performed while the edge of the ring-shaped insulating layer 28 opposing to the pole portion is utilized as the reference position, and thus if a position of this edge of the insulating layer is shifted during the heating treatment, the MR height is also deviated from the desired design value.

Moreover, if the photo-resist layers 33, 36 constituting the ring-shaped insulating layer 28 and the insulating layer which isolates the thin film coil to be explained later are melt, the apex angle θ defined by an inclination angle of the side surface of these insulating layers might be also deviated. The performance of the thin film magnetic head also depends on this apex angle θ, and might be sometimes affected by the deviation of the apex angle.

Therefore, it is important that a position of the edge of photo-resist layer forming the ring-shaped insulating layer is not varied even under the heating treatment of about 250° C. carried out the formation of the thin film coil. In the present embodiment, after forming the ring-shaped photo-resist insulating layer 28, the alumina insulating layer 29 constituting the write gap is formed such that the photo-resist insulating layer is covered with the alumina insulating layer as shown in FIGS. 17a and 17b, and therefore the edge of the photo-resist insulating layer 28 is no more shifted by the heating treatment and undesired deviations of the throat height TH as well as the MR height MRH and apex angle θ from the desired design values can be effectively suppressed.

Next, as illustrated in FIGS. 18a and 18b, a second magnetic layer 30 (pole chip) defining the track width W is selectively formed to have a thickness of about 1–4 μm. Then, the write gap in the vicinity of the pole chip is selectively removed an opening, and the first magnetic layer 27 exposed in the opening is etched by, for instance an ion beam milling, to form the pole portion.

It should be noted that in the present invention, as shown by H in FIG. 18a, the pole portion means a portion of a region extending from the outer edge of the ring-shaped insulating layer 28 to an end surface of the stacked body, along said portion the first magnetic layer 27, write gap layer 29 and second magnetic layer 30 being adjoined with the width W (see FIG. 18b). Therefore, in a final product, after polishing the end surface to form the air bearing surface, the pole portion becomes a region extending from the outer edge of the ring-shaped insulating layer 28 to the air bearing surface and is identical with the throat height TH.

According to the invention, upon forming the pole chip, it is important that the second magnetic layer 30 is extended not only over the pole portion but also over the surface of the ring-shaped insulating layer 28 which is positioned behind the pole portion as depicted in FIG. 19. In the known thin film magnetic head in which the top pole is deposited on the pole chip, a contact area between the pole chip and the top pole is small and an end surface of the top pole is perpendicular to the surface of the pole chip. Therefore, a magnetic flux is liable to be saturated at this portion and a sufficiently satisfactory writing property could not be obtained. According to the present invention, a contact area between the pole chip and the top pole is not limited to the pole portion, but is extended up to a rear portion such that the above mentioned saturation of magnetic flux can be effectively removed and a sufficiently satisfactory writing property can be attained. In this case, if a sufficiently large contact area can be obtained, the contact region between the pole chip and the top pole may be restricted to a rear region with respect to the pole portion. In this specification, the term "rear" means a direction remote from the air bearing surface.

According to the invention, a shape of the rear portion of the pole chip behind the pole portion may be modified in various ways. For instance, the rear portion of the pole chip may be extended in a straight forward manner as shown in FIG. 19, or may be gradually widened as depicted in FIG. 20. At any rate, according to the invention, it is sufficient that the pole chip and top pole are contacted with each other in the rear region behind the pole portion.

It should be noted that a length h of the backwardly extended portion of pole chip behind the pole portion may be preferably set to about 2–5 μm which does not exceed a thickness of the ring-shaped insulating layer 28, and more particularly to a value substantially equal to a thickness of the top pole.

Furthermore, in the embodiment shown in FIG. 20, the rear portion of the pole chip behind the pole portion is widened at an angle of about 90°, but according to the invention, this widening angle is not limited only to such an angle, but may be set to an angle not larger than 180°, and a more preferably widening angle range is 45–180°.

In this manner, when the rear portion of the pole chip is widened like a fan as shown in FIG. 20, not only the above mentioned saturation of magnetic flux does not occur, but also a more accurate pattern control in the photolithography can be performed and the throat height TH can be much more accurately controlled.

After forming the second magnetic layer 30 as explained above, a first layer thin film coil is to be formed in a region surrounded by the ring-shaped insulating layer 28. Prior to the formation of the thin film coil, a non-magnetic and non-conductive layer such as an alumina layer having a thickness of about 0.5–1.5 μm is deposited as illustrated in FIGS. 21a and 21b. By covering at least the area on which the thin film coil is to be formed with the non-magnetic and nonconductive layer 31, an isolation between the first magnetic layer 27 and the thin film coil can be improved and a leakage of magnetic field can be effectively avoided. Moreover, it is preferable to cover not only the inside of the ring-shaped insulating layer 28, but also the whole surfaces of the ring-shaped insulating layer and second magnetic layer (pole chip) 30.

Next, as shown in FIGS. 22a and 22b, after forming a first layer thin film coil 32 made of a copper on the region surrounded by the ring-shaped insulating layer 28, an insulating photo-resist layer 33 is formed with a highly precise mask alignment, and then a heating treatment is conducted at a temperature of, for instance 250° C. in order to obtain a flat surface. In this manner, according to the invention, the first layer thin film coil 32 is formed on the region surrounded by the ring-shaped insulating layer 28, and therefore a whole height of the thin film coil can be decreased. That is to say, in the known thin film magnetic head, since the thin film is formed on the insulating layer, when two or three layer thin film coil is formed in order to improve a performance of the writing magnetic head, a height of the coil portion is increased. Then, it is difficult to reduce a track width. According to the invention, at least the first layer thin film coil is formed within the ring-shaped insulating layer 28, an apex height can be deceased accordingly. On the other hand, if the apex height is made substantially identical with that of the known magnetic head, the number of coil turns may be increased accordingly and a superior performance may be attained.

Next, as shown in FIGS. 23a and 23b, on a whole surface is formed an alumina insulating layer 34 having a thickness of 4–5 μm, and then the surface is flattened by, for instance CMP such that the first layer thin film coil 32 is covered with the insulating layer 34, but the pole chip (second magnetic layer), contact portions of the first layer thin film coil and a through hole (not shown) for connecting the bottom pole and top pole (third magnetic layer) are exposed.

After that, as illustrated in FIGS. 24a and 24b, after forming a second layer thin film coil 35, a photo-resist layer 36 is formed on the second layer thin film coil. Then, in order to flatten the surface, a heating treatment is conducted at a temperature of, for instance 250° C.

Next, a third magnetic layer (top pole) 37 made of, for instance permalloy and having a thickness of 3 μm is selectively formed on the second magnetic layer (pole chi) 30 and photo-resist layer 36 in accordance with a given pattern as shown in FIGS. 25a and 25b.

Upon forming the third magnetic layer 37, it is preferable that a front end of the third magnetic layer is retarded from the air bearing surface by a distance equal to the throat height TH as shown in FIG. 25a (in the drawing, shown by L). This is due to a fact that when the front end of the third magnetic layer extends up to the air bearing surface, if a positional relationship between the pole chip and the tope pole is shifted largely on one side, a data writing might be carried out also through the front end of the top pole and an effective track width might be widened, but when the front end of the third magnetic layer is retarded from the air bearing surface, such a demerit can be avoided.

It should be noted that if the front end of the top pole is retarded from the air bearing surface in the known thin film magnetic head, a contact area between the pole chip and the top pole is decreased accordingly and a leakage of magnetic flux could not be avoided. According to the present invention, since this contact area can be sufficiently large by providing the rear portion behind the pole portion, even if the front end of the top pole is retarded from the air bearing surface, undesired leakage of magnetic flux does not occur.

Upon forming the third magnetic layer 37, it is desired that the third magnetic layer follows a configuration of the second magnetic layer 30 as shown in FIG. 20. Moreover, when the widening angle of the second magnetic layer 30 is small such as 30–60° as illustrated in FIG. 26, a front end portion of the third magnetic layer 37 may be formed to follow the shape of the second magnetic layer such that the third magnetic layer is also gradually widened at the widening angle of 30–60°, and a rear portion of the third magnetic layer may be further widened at a desired widening angle.

In this manner, by forming the third magnetic layer such that it is gradually widened to cover the second magnetic layer 30, even if an error occurs in an alignment between the pole chip 30 and the top pole 37, a variation in a contact area therebetween is remained small and a leakage of magnetic flux can be avoided.

It should be noted that the third magnetic layer 37 is brought into contact with the first magnetic layer 27 by means of the through hole provided at a position remote from the pole portion, and the thin film coil 32, 35 passes through a closed magnetic path constituted by the first, second and third magnetic layers.

Next, as depicted in FIGS. 27a and 27b, an overcoat layer 38 made an alumina and the like is deposited on an exposed surface of the third magnetic layer 37.

Finally, as illustrated in FIGS. 27 and 28, a side wall on which the magnetoresistive layer 25 and gap layer 29 is polished to form an air bearing surface 39, which is to be opposed to a magnetic record medium.

During the polishing, the edge of ring-shaped insulating layer 28 on a side of the pole portion is utilized as the reference position for the air bearing surface 39, and therefore the throat height TH, MR height MRH and apex angle θ can be accurately determined in accordance with desired design values.

Figures 29A, 29B:
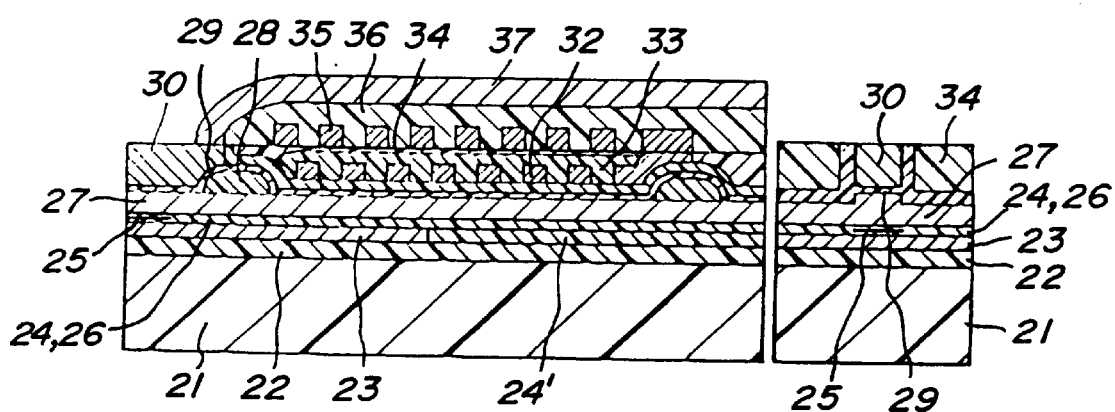
FIGS. 29a and 29b are cross sectional views cut along a plane perpendicular to the air bearing surface as well as along a plane parallel with the air bearing surface showing another embodiment of the thin film magnetic head according to the invention.

FIGS. 29a and 29b are cross sectional views showing another embodiment of the thin film magnetic head according to the invention, in which the pole chip 30 is formed to have a large thickness. By increasing a thickness of the pole chip 30, a distance over which the front end of the top pole 37 is retarded from the air bearing surface 39 can be increased. As a result of this, even if the front end of the top pole 37 is closer to the air bearing surface due to a variation in process for the air bearing surface, a writing operation to another track can be prevented and thus an undesired increase in an effective track width can be much more effectively prevented.

In the embodiments so far explained, the band-shaped insulating layer 28 having at least the portion whose edge on a side of the pole portion serves as the reference position for the air bearing surface is formed as the elliptical ring-shape as shown in FIG. 30a. According to the invention, the band-shaped insulating layer is not limited to such a ring-shaped one, but may be formed in various shapes. For instance, substantially ring-shapes shown in FIGS. 30b and 30c, or parts of elliptical, octagonal and rectangular ring-shapes as illustrated in FIGS. 30d, 30e and 30f, respectively, or rectilinear shapes as depicted in FIGS. 30g, 30h and 30i.

Now a second embodiment of the method of manufacturing the thin film magnetic head according to the invention will be explained with reference to FIGS. 31–42. In these drawings, a represents a cross sectional view cut along a plane perpendicular to the air bearing surface and b shows a cross sectional view of the pole portion cut along a plane parallel with the air bearing surface. Also in this embodiment, a composite type thin film magnetic head is manufactured by forming a magnetoresistive type reading thin film magnetic head on a substrate and then forming an inductive type thin film magnetic head on the magnetoresistive type thin film magnetic head.

As shown in FIGS. 31a and 31b, on a main substrate 21 made of an AlTiC, is deposited an insulating layer 72 made of an alumina having a thickness of about 3–5 $\mu$m. In the present specification, an assembly of these main substrate 71 and insulating layer 72 is called substrate or wafer 73. Moreover, in the specification, the insulating layer means a film having at least an electrically insulating property, and may or may not have a non-magnetic property. Generally used material such as alumina has both the electrically insulating and non-magnetic properties, an insulating layer sometimes means a non-magnetic layer.

Furthermore, in a practical manufacturing, after forming a number of thin film magnetic heads on a wafer in a matrix form, the wafer is divided into a plurality of bars, a end surface of a bar is polished to form air bearing surfaces, and finally the bar is divided into respective thin film magnetic heads. Therefore, during the formation on the wafer, the end surface of the thin film magnetic head does not appear, but for the sake of explanation, this end surface is shown.

Next, on the insulating layer 72 of the substrate 73, a permalloy layer constituting a bottom shield layer 74 for the magneto-resistive type thin film magnetic head is formed to have a thickness of about 3 $\mu$m. The bottom shield layer 74 is formed in accordance with a given pattern by a plating method using a photo-resist mask.

Next, a GMR layer 76 is formed on the bottom shield layer 74 such that the GMR layer is embedded in a shield gap layer 75 made of alumina as illustrated in FIGS. 32a and 32b. A thickness of this shield gap layer 75 may be 0.2 $\mu$m. On the shield gap layer 75 in which the GMR layer 76 is embedded, is formed a first magnetic layer 77 made of a permalloy and having a thickness of 3–4 $\mu$m, said first magnetic layer constituting the top shield for the GMR layer as well as the bottom pole of the inductive thin film magnetic head.

Next, in order to isolate the first magnetic layer 77 from a thin film coil to be formed later as well as to prevent a leakage of magnetic flux, an alumina insulating layer 78 having a thickness of 0.3–0.7 $\mu$m is formed on the first magnetic layer 77, and then on the alumina insulating layer, is formed an insulating layer 79 made of silicon oxide to have a thickness of 0.5–2.0 $\mu$m as shown in FIGS. 33a and 33b. In the present embodiment, this insulating layer made of silicon oxide is formed by the plasma CVD while the substrate is heat at temperature of 150° C., but it may be formed by a sputtering at a room temperature. Furthermore, the insulating layer may be made of other inorganic materials such as alumina and silicon nitride instead of silicon oxide.

Next, the insulating layer made of silicon oxide is selectively etched to form a band-shaped insulating layer 79, and then the alumina insulating layer 78 is selectively etched by a reactive ion etching as shown in FIGS. 34a and 34b, said reactive ion etching being performed by using a freon based gas such as $CF_4$ and $SF_6$ or a chlorine based gas such as $Cl_2$ and $BCl_2$. FIG. 35 is a plan view showing the thus formed ring-shaped insulating layer 79. About a center of the ring-shaped insulating layer 79, there is formed an opening 78a in the insulating layer 78, and the first magnetic layer 77 is exposed in this opening. In FIG. 35, for the sake of clarity, a third magnetic layer constituting the pole chip and a thin film coil to be formed later are shown by imaginary lines.

Next, as shown in FIGS. 36a and 36b, a write gap layer 80 made of an alumina and having a thickness of 0.1–0.3 $\mu$m is formed in accordance with a given pattern on the exposed surface of the first magnetic layer 77 and surfaces of the insulating layers 78 and 79. According to the invention, a thickness of said ring-shaped insulating layer 79 is substantially larger than that of the write gap layer 80. Then, a second magnetic layer 81 constituting the pole chip defining the track width and made of a magnetic material having a high saturation magnetic flux density is formed to have a thickness of 3–4 $\mu$m. The magnetic material having a high saturation magnetic flux density may be NiFe (50%, 50%) or FeN. The second magnetic layer 81 constituting the pole chip may be formed in accordance with a given pattern by a plating method or by a dry-etching after sputtering.

According to the present invention, as shown in a plan view of FIG. 35, the second magnetic layer 81 may preferably include a pole portion 81a and a connecting portion 81b which extends over the ring-shaped insulating layer 79, a width of said connecting portion being gradually increased. This connecting portion may be formed into a triangular shape or pentagonal shape as illustrated in FIG. 35. Since the record track width is determined by a width W of the pole portion 81a of the second magnetic layer 81, it is preferable to form said width narrow such as 0.5–1.2 $\mu$m.

Next, as shown in FIGS. 37a and 37b, a part of the gap layer 80 adjacent to the pole portion 81a is selectively removed by a reactive ion etching process using a freon based gas such as $CF_4$ and $SF_6$ or a chlorine based gas such as $Cl_2$ and $BCl_2$ to exposed the underlying first magnetic layer 77. Then, an ion beam etching process using an argon gas is conducted, while the pole portion 81a of the second magnetic layer 81 and ring-shaped insulating layer 79 as a mask such that the exposed surface of the first magnetic layer 77 is dug down over a depth of about 0.5 $\mu$m to form the trim structure. The construction of the pole portion at this processing stage is also shown in a perspective view of FIG. 38.

In the present embodiment, since the ring-shaped insulating layer 79 is made of an inorganic insulating material, a position of the edge of the insulating is not deviated and the insulating layer is not peeled-off during the reactive ion etching and ion beam etching for obtaining the trim structure. Therefore, a manufacturing yield can be improved and a durability of the magnetic head can be increased.

Next, as illustrated in FIGS. 39a and 39b, a first layer thin film coil 83 is formed within an area surrounded by the ring-shaped insulating layer 79 such that the thin film coil is supported by a photo-resist layer 82 in an electrically isolated manner, and then a second layer thin film coil 85 is formed such that the tin film coil is supported by a photo-resist layer 84 in an electrically isolated manner. In the present embodiment, an air space of 2–3 $\mu$m is formed between the photo-resist layers 82, 84 and the second magnetic layer 81.

Then, as shown in FIGS. 40a and 40b, a third magnetic layer 86 having a thickness of 3–4 $\mu$m is formed in accordance with a given pattern such that a front end of the third magnetic layer on a side of the air bearing surface is brought into contact with the connecting portion 81b of the second magnetic layer 81 and a rear end of the third magnetic layer remote from the air bearing surface is connected to the first magnetic layer 77 via the opening 78a formed in the insulating layer 78 as depicted in FIG. 41. In this manner, a contact area between the second and third magnetic layers 81 and 86 can be increased, and thus a leakage of magnetic flux at the pole portion can be further effectively suppressed. Such an advantage is particularly important when a width of the first layer 81 constituting the pole chip is not larger than 100 $\mu$m.

Furthermore, as illustrated in FIGS. 42a and 42b, an overcoat layer 87 made of an alumina and having a thickness of 20–30 $\mu$m is formed on a whole surface. As stated above, in the practical manufacturing process, the wafer is cut into bars and a side face of a bar is polished to form the air bearing surface. In the present embodiment, a position of the edge of the ring-shaped insulating layer 79 on a side of the air bearing surface is used as the reference position and this position is not shifted during the manufacturing, and therefore it is possible to obtain easily the throat height TH having a desired design value.

In the present embodiment, the band-shaped insulating layer 79 having a large thickness is formed in a ring-shape and the thin film coil 83, 85 is arranged within the ring. According to the invention, the band-shaped insulating layer is not always necessary to be formed into a ring-shape, but may be formed in any other shape. For instance, the insulating layer may be formed as a frame shape as shown in FIG. 43 or may be formed rectilinearly as illustrated in FIG. 44. According to the invention, as long as the band-shaped insulating layer 79 has an air bearing surface side edge which can define the throat height zero position and has a thickness larger than that of the write gap layer, it may be formed into any shape as shown in FIGS. 30a–30i.

Moreover, in the present embodiment, the connecting portion 81b of the second magnetic layer 81 and the third magnetic layers 86 are joined to each other at the surface, side walls and end surface of the connecting portion. However, according to the invention, the third magnetic layer 86 may be brought into contact with the surface and side walls of the connecting portion 81b of the second magnetic layer 81 as illustrated in FIG. 44.

Figure 45:
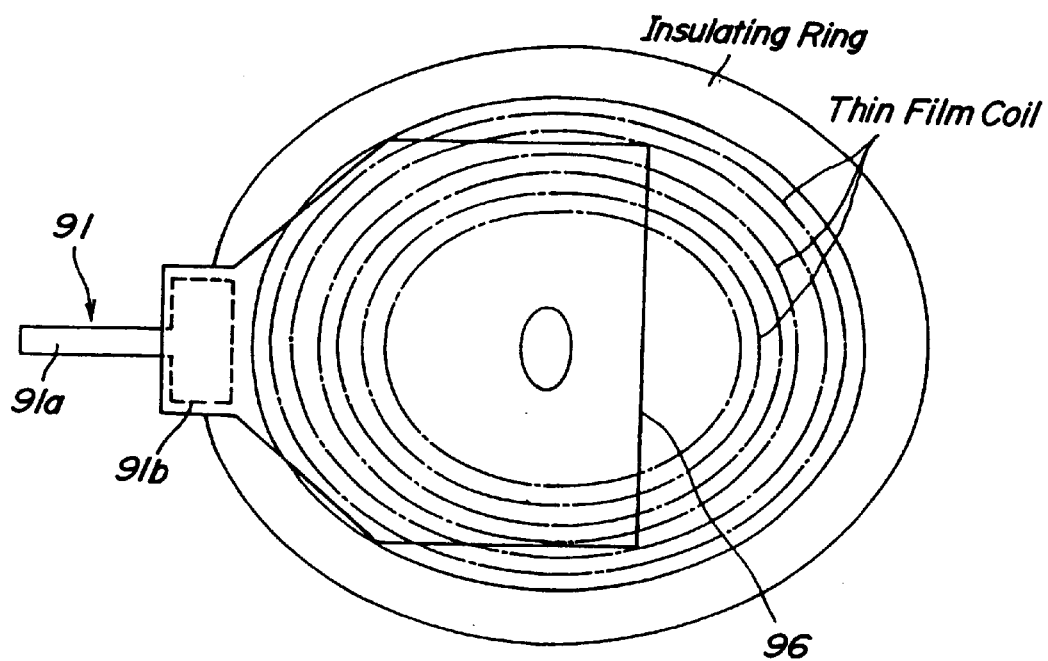
FIG. 45 is a diagrammatic plan view illustrating a configuration of a coupled portion of the second magnetic layer in another embodiment of the thin film magnetic head according to the invention.

The present invention is not limited to the embodiments explained above, but many alternations and modifications may be conceived by those skilled in the art. For instance, in the above mentioned embodiments, the connecting portion of the second magnetic layer and the front portion of the third magnetic layer lying over the connecting portion are formed to be gradually widened. The second magnetic layer 91 may be formed such that a pole portion 91a is connected to a connecting portion 91b at right angles as shown in FIG. 45. In this case, a widening angle of the connecting portion 91a of the second magnetic layer 91 may be considered to be 180°. Also in this case, the front end portion of the third magnetic layer 96 extending over the connecting portion 91b of the second magnetic layer 91 may be formed to have a constant width in accordance with a shape of the underlying connecting portion. Even if the widening angle is set to 180°, it has been experimentally confirmed that the improved over write property can be obtained and an increase in the effective track width can be suppressed.

Further, in the above embodiments, the reading magnetoresistive type thin film magnetic head is provided on the substrate and the writing inductive type thin film magnetic head is stacked on the reading magnetic head, but according to the invention this stacking order may be reversed. In the above embodiments, the magnetoresistive element is formed by a GMR element, but it may be formed by an AMR element. Moreover, according to the invention, the reading thin film magnetic head is not limited to the magnetoresistive element, but may be formed by any other thin film magnetic head. It should be further noted that the reading thin film magnetic head is not always necessary, but only the inductive type thin film magnetic head may be provided.

According to the invention, the second magnetic layer constituting the pole chip may be advantageously made of any kind of a magnetic material having a high saturation magnetic flux density such as a Fe—Cr—Zr based amorphous alloy and a Fe—C based amorphous alloy in addition to the above mentioned permalloy (Ni: 50%, Fe: 50%) and iron nitride (FeN). It should be noted that plural layers of two or more than two kinds of these materials may be stacked.

The first and third magnetic layers may be advantageously made of known magnetic materials having a high saturation magnetic flux density in addition to the above mentioned permalloy (Ni: 80%, Fe: 20%).

The write gap layer may be made of an oxide such as $Al_2O_3$ and $SiO_2$, or a nitride such as AlN, BN and SiN, or an electrically conductive but magnetically non-conductive material such as Au, Cu and NiP.

In the embodiments shown in the drawings, the insulating layer having the edge on a side of the air bearing surface side gives the reference position for the air bearing surface is made of a photo-resist, but according to the invention, this insulating layer may be made of alumina, silicon or silicon nitride.

In the first embodiment, the insulating layer 28 is made of a photo-resist and in the second embodiment, the insulating layer 78 is made of a silicon oxide, but they may be made of other inorganic insulating material. However, these insulating layers are preferably made of an inorganic insulating material from a view point that these layers serve as a mask in the etching process for forming the trim structure.

According to the present invention, the band-shaped insulating layer is provided on the first magnetic layer such that the edge of the insulating layer on a side of the air bearing surface defines the reference position for the air bearing surface, and this insulating layer is covered with the write gap layer made of alumina. Therefore, the insulating layer is not melt by the heating treatment during the formation of the thin film coil and a position of the edge is not shifted, and thus the throat height TH, MR height MRH and apex angle θ can be formed accurately in accordance with desired design values.

Therefore, according to the invention, there is always existent a desired relationship between the throat height TH and the MR height MRH, and thus the writing head and reading head can be remained always in an optimum condition. As the result of this, it is possible to provide a composite type thin film magnetic head having a superior performance.

Moreover, according to the invention, the second magnetic layer (pole chip) and the third magnetic layer top pole) are joined to each other not only at the pole portion, but also at the rear portion having a larger surface area, and the magnetic flux generated by the coil is not saturated and a leakage of the magnetic flux at the connecting portion can be suppressed, and thus data can be recorded efficiently on a very narrow track. In this manner, it is possible to obtain a satisfactory writing performance. That is to say, the third magnetic layer may be brought into contact with the surface, or the surface and side walls, or the surface, side walls and end surface of the connecting portion of the second magnetic layer, and a very large contact area can be obtained.

Moreover, by widening the rear portion of the second magnetic layer, a contact area between the top pole and the pole chip can be increased, and thus a leakage of the magnetic flux at this portion can be effectively prevented.

By widening the third magnetic layer covering the second magnetic layer, even if an error is introduced in an alignment of these layers, a contact area is not changed and a leakage of magnetic flux can be still avoided.

Furthermore, according to the invention, the front end of the third magnetic layer is retarded from the air bearing surface and a contact portion between the second and third magnetic layers is not exposed on the air bearing surface, and therefore even if a relative position of the top pole with respect to the pole chip deviates viewed from the air bearing surface, the writing operation through the top pole can be avoided and an increase in the effective track width can be prevented.

Moreover, according to the invention, since the apex height can be reduced as compared with the known thin film magnetic head, a track width of the recording head can be effectively reduced, or if the apex angle is set to be substantially equal to that of the known head, the number of coil windings can be increased accordingly and the recording performance can be improved.

In the embodiment of the thin film magnetic head according to the invention, in which the band-shaped insulating layer is formed into a ring-shape and the thin film coil is formed within the ring, a height of the thin film coil consisting of two or three layers can be reduced by a distance substantially equal to a thickness of the insulating layer, and thus the apex angle can be decreased and the number of coil windings can be increased. In this manner, an efficiency of the thin film coil can be improved.

Further, as shown in the second embodiment, when the band-shaped insulating layer having a large thickness is made of an inorganic material, the edge of the inorganic insulating layer is hardly shifted during the etching process for forming the trim structure, and thus a portion of the insulating layer situating under the second magnetic layer constituting the pole chip is neither damaged nor peeled-off and a position of the insulating layer is not shifted. Therefore, a degradation of the performance of the thin film magnetic head can be suppressed. Further, since the insulating layer is not peeled-off, no oil and polishing liquid could not be retained between the insulating layer and the first magnetic layer, a manufacturing yield can be increased and a durability of the thin film magnetic head can be prolonged.

What is claimed is:

1. A method of manufacturing a thin film magnetic head comprising the steps of:

forming a first magnetic layer having a first pole portion such that the first magnetic layer is support by a substrate;

forming a band-shaped insulating layer on said first magnetic layer, said band-shaped insulating layer having at least a portion whose edge defines a reference position for an air bearing surface;

forming a gap layer made of non-magnetic material on at least said first pole portion of the first magnetic layer;

forming a second magnetic layer, having a second pole portion, on said gap layer at least at a portion of the gap layer situated on said first magnetic layer;

forming a thin film coil in a rear region on a side of the band-shaped insulating layer opposite to said air bearing surface such that the thin film coil is supported by an insulating material in an electrically isolated manner;

forming a third magnetic layer such that the third magnetic layer is coupled with said second magnetic layer as well as with said first magnetic layer at a rear portion opposite to said air bearing surface; and polishing the substrate, the first pole portion of the first magnetic layer and the second pole portion of the second magnetic layer and the gap layer sandwiched between the first magnetic layer and the second magnetic layer to form the air bearing surface which is to be opposed to a magnetic record medium.

2. The method of manufacturing the magnetic head according to claim 1, wherein after forming said band-shaped insulating layer, said gap layer is formed to cover at least the first pole portion of the first magnetic layer and the band-shaped insulating layer.

3. The method of manufacturing the magnetic head according to claim 2, wherein said gap layer is formed to cover at least a region behind said band-shaped insulating layer.

4. The method of manufacturing the magnetic head according to claim 1, wherein said second magnetic layer is formed to extend not only over the first magnetic layer, but also over a surface of the band-shaped insulating layer behind the first pole portion of the first magnetic layer.

5. The method of manufacturing the magnetic head according to claim 4, wherein a width of a rear portion of second magnetic layer is gradually increased.

6. The method of manufacturing the magnetic head according to claim 1, wherein said band-shaped insulating layer is formed into a ring-shape, and prior to the formation of the thin film coil, said second magnetic layer, a surface of said ring-shaped insulating layer and an inner region surrounded by the ring-shaped insulating layer is covered with a non-magnetic and non-conductive film.

7. The method of manufacturing the magnetic head according to claim 6, wherein surfaces of said second magnetic layer, the non-magnetic and the non-conductive film are polished to be flat.

8. The method of manufacturing the magnetic head according to claim 1, wherein said third magnetic layer is formed such that a front end of the third magnetic layer is retarded from the air bearing surface and a contact portion between the third magnetic layer and the second magnetic layer is not exposed on the air bearing surface.

9. The method of manufacturing the magnetic head according claim 1, wherein a magnetoresistive reproducing element for reading is provided between said substrate and said first magnetic layer in an electrically insulated and magnetically shielded manner to construct a composite type thin film magnetic head.

10. The method of manufacturing the magnetic head according to claim 9, wherein a first shield layer for a magnetic shield is formed on the substrate, a magnetoresistive material film is formed on the first shield layer such that the magnetoresistive material film is embedded within an insulating layer, and during the step of polishing the air bearing surface, said first shield layer and the magnetoresistive material film are also polished to form said magnetoresistive reproducing element having an end surface exposed on the air bearing surface.

11. A method of manufacturing a thin film magnetic head comprising the steps of:

forming a first magnetic layer having a first pole portion such that the first magnetic layer is support by a substrate;

forming a band-shaped insulating layer on said first magnetic layer, said band-shaped insulating layer having at least a portion whose edge defines a reference position for an air bearing surface;

forming a gap layer made of non-magnetic material on at least said first pole portion of the first magnetic layer;

forming a second magnetic layer, having a second pole portion, on said gap layer at least at a portion of the gap layer situated on said first magnetic layer;

forming a thin film coil in a rear region on a side of the band-shaped insulating layer opposite to said air bearing surface such that the thin film coil is supported by an insulating material in an electrically isolated manner;

forming a third magnetic layer such that the third magnetic layer is coupled with said second magnetic layer as well as with said first magnetic layer at a rear portion opposite to said air bearing surface; and polishing the substrate, the first pole portion of the first magnetic layer and the second pole portion of the second magnetic layer and the gap layer sandwiched between the first magnetic layer and the second magnetic layer to form the air bearing surface which is to be opposed to a magnetic record medium, wherein after forming said second magnetic layer, said thin film coil supported by the insulating material in an isolated manner is formed such that an end surface of the second magnetic layer is covered with said insulating material, and said third magnetic layer is formed such that the third magnetic layer is brought into contact with the air bearing surface and side walls of the rear portion of the second magnetic layer.

12. A method of manufacturing a thin film magnetic head comprising the steps of:

forming a first magnetic layer having a first pole portion such that the first magnetic layer is support by a substrate;

forming a band-shaped insulating layer on said first magnetic layer, said band-shaped insulating layer having at least a portion whose edge defines a reference position for an air bearing surface;

forming a gap layer made of non-magnetic material on at least said first pole portion of the first magnetic layer;

forming a second magnetic layer, having a second pole portion, on said gap layer at least at a portion of the gap layer situated on said first magnetic layer;

forming a thin film coil in a rear region on a side of the band-shaped insulating layer opposite to said air bearing surface such that the thin film coil is supported by an insulating material in an electrically isolated manner;

forming a third magnetic layer such that the third magnetic layer is coupled with said second magnetic layer as well as with said first magnetic layer at a rear portion opposite to said air bearing surface; and polishing the substrate, the first pole portion of the first magnetic layer and the second pole portion of the second magnetic layer and the gap layer sandwiched between the first magnetic and the second magnetic layer to form the air bearing surface which is to be opposed to a magnetic record medium, wherein after forming said second magnetic layer, said thin film coil supported by the insulating material in an isolated manner is formed such that a space is formed between an end surface of the second magnetic layer and said insulating material, and said third magnetic layer is formed to fill said space such that the third magnetic layer is brought into contact with the air bearing surface, side walls and end surface of the rear portion of the second magnetic layer.

* * * * *